(12) United States Patent
Iiyama et al.

(10) Patent No.: US 8,773,616 B2
(45) Date of Patent: Jul. 8, 2014

(54) ILLUMINATING LENS, LIGHTING DEVICE, SURFACE LIGHT SOURCE, AND LIQUID CRYSTAL DISPLAY APPARATUS

(75) Inventors: Tomoko Iiyama, Osaka (JP); Syunsuke Kimura, Hyogo (JP); Daizaburo Matsuki, Osaka (JP)

(73) Assignee: Panasonic Corporation, Osaka (JP)

( * ) Notice: Subject to any disclaimer, the term of this patent is extended or adjusted under 35 U.S.C. 154(b) by 775 days.

(21) Appl. No.: 13/058,143

(22) PCT Filed: Aug. 6, 2010

(86) PCT No.: PCT/JP2010/004979
§ 371 (c)(1),
(2), (4) Date: Feb. 8, 2011

(87) PCT Pub. No.: WO2011/048735
PCT Pub. Date: Apr. 28, 2011

(65) Prior Publication Data
US 2011/0279751 A1    Nov. 17, 2011

(30) Foreign Application Priority Data
Oct. 19, 2009   (JP) ................. 2009-240029

(51) Int. Cl.
*G02F 1/1335*   (2006.01)
*G02B 6/32*   (2006.01)

(52) U.S. Cl.
USPC ............................................. 349/64; 385/33

(58) Field of Classification Search
USPC ............................................. 349/64; 385/33
See application file for complete search history.

(56) References Cited

U.S. PATENT DOCUMENTS

| | | | |
|---|---|---|---|
| 4,609,978 A | 9/1986 | Hsieh et al. | |
| 6,851,841 B2 | 2/2005 | Sugihara et al. | |
| 7,348,723 B2 | 3/2008 | Yamaguchi et al. | |
| 7,443,609 B2 | 10/2008 | Yoon et al. | |

(Continued)

FOREIGN PATENT DOCUMENTS

| | | |
|---|---|---|
| JP | 2001-250986 | 9/2001 |
| JP | 2003-281908 | 10/2003 |

(Continued)

*Primary Examiner* — Eric Wong
(74) *Attorney, Agent, or Firm* — Hamre, Schumann, Mueller & Larson, P.C.

(57) ABSTRACT

An illuminating lens (1) includes a light entrance surface (11), a light exit surface (12), and a bottom surface (13). The light entrance surface (11) has a first light entrance surface (111) and a second light entrance surface (112). The first light entrance surface (111) is a curved surface convex toward the light exit surface (12) and perpendicularly intersecting an optical axis A, and the second light entrance surface (112) extends outwardly from an edge of the first light entrance surface (111) and is connected obliquely to an inner edge of the bottom surface (13). In a cross section in a light spreading direction, θ1 has a negative value at the first light entrance surface (111) and a positive value at the second light entrance surface (112), where θ1 is a refraction angle at which virtual light reaching the light entrance surface (11) directly from a starting point Q on the optical axis A corresponding to a position of a light source (20) passes through the light entrance surface (11), and θ1 is defined as negative when θ1 is on the side of the optical axis A with respect to a normal N to the light entrance surface (11) and as positive when θ1 is on the opposite side.

15 Claims, 27 Drawing Sheets

(56) References Cited

U.S. PATENT DOCUMENTS

| | | |
|---|---|---|
| 7,572,036 B2 | 8/2009 | Yoon et al. |
| 7,746,565 B2 | 6/2010 | Paek et al. |
| 7,762,692 B2 | 7/2010 | Lai et al. |
| 2008/0101063 A1 | 5/2008 | Koike et al. |
| 2008/0151551 A1 | 6/2008 | Yang et al. |
| 2008/0158875 A1 | 7/2008 | Kim et al. |
| 2009/0225550 A1 | 9/2009 | Yamaguchi |
| 2010/0135028 A1* | 6/2010 | Kokubo ................ 362/311.06 |

FOREIGN PATENT DOCUMENTS

| | | |
|---|---|---|
| JP | 2006-293274 | 10/2006 |
| JP | 3875247 | 11/2006 |
| JP | 2008-166250 | 7/2008 |
| JP | 2009-043628 | 2/2009 |
| JP | 2009-211990 | 9/2009 |

* cited by examiner

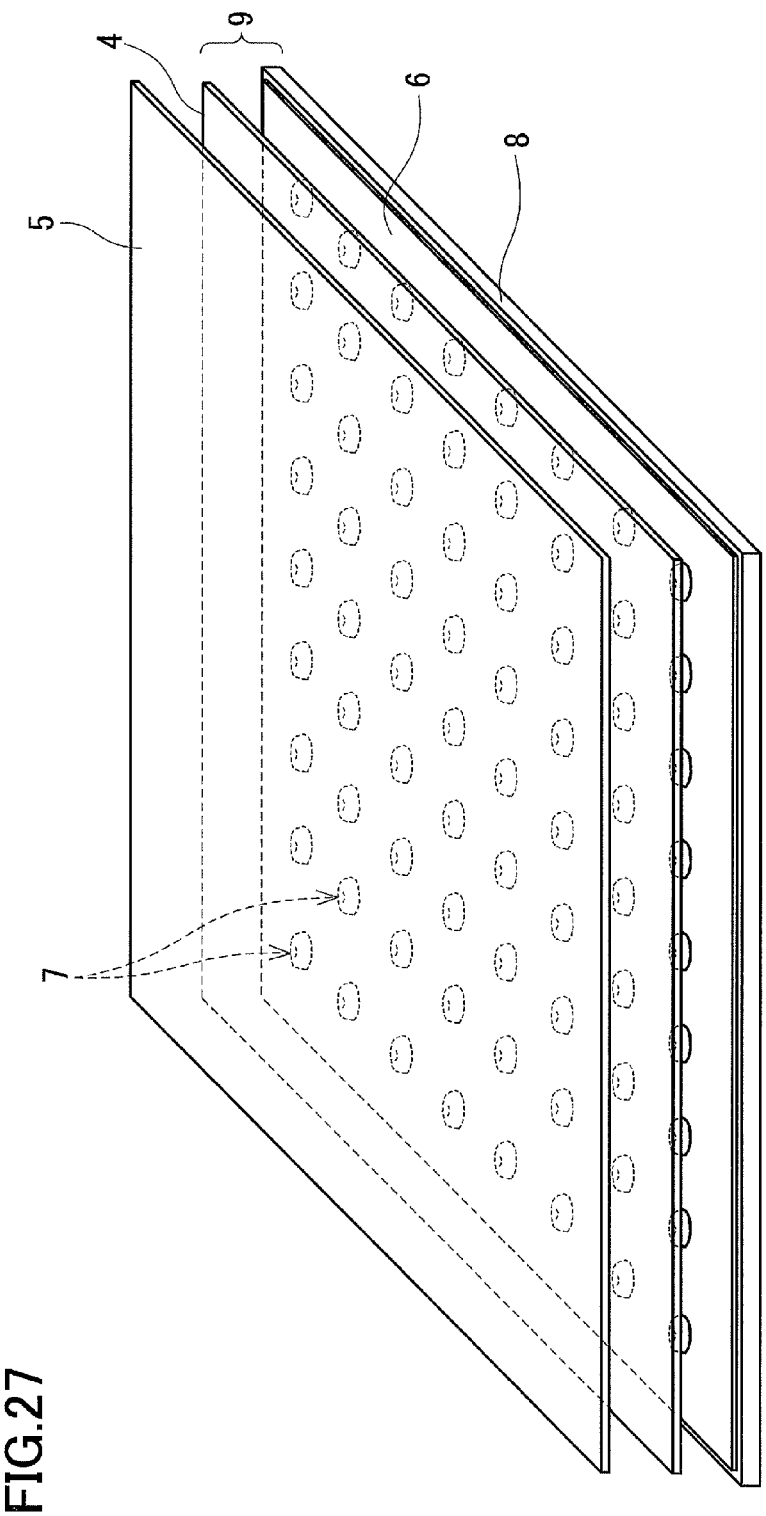

ILLUMINATING LENS, LIGHTING DEVICE, SURFACE LIGHT SOURCE, AND LIQUID CRYSTAL DISPLAY APPARATUS

TECHNICAL FIELD

The present invention relates to an illuminating lens for widening a range of light transmission directions of a light source such as a light emitting diode, and to a lighting device using this illuminating lens. The present invention further relates to a surface light source including a plurality of lighting devices, and to a liquid crystal display apparatus in which this surface light source is disposed as a backlight behind a liquid crystal panel.

BACKGROUND ART

In a conventional backlight of a large-sized liquid crystal display apparatus, a number of cold cathode tubes are disposed immediately below a liquid crystal panel, and these cold cathode tubes are used with other members such as a diffusing plate and a reflecting plate. In recent years, light emitting diodes (hereinafter referred to as "LEDs") have been used as light sources for backlights. LEDs have increased their efficiency recently, and are expected to serve as low-power light sources to replace fluorescent lamps. In the case where LEDs are used as a light source in a liquid crystal display apparatus, the power consumption of the apparatus can be reduced by controlling the brightness of the LEDs according to an image to be displayed.

In a backlight of a liquid crystal display apparatus using LEDs as a light source, a large number of LEDs are disposed therein instead of cold cathode tubes. The use of a large number of LEDs allows the entire surface of the backlight to have uniform brightness, but the need for such a large number of LEDs is an obstacle to cost reduction. Attempts have been made to increase the output power of each LED to reduce the required number of LEDs. For example, Patent Literature 1 has proposed a lens that is designed to provide a uniform surface light source with a reduced number of LEDs.

In order to obtain a uniform surface light source with a reduced number of LEDs, the area to be illuminated by light emitted from each LED needs to be increased. That is, light emitted from each LED needs to be spread to obtain a wider range of light transmission directions of the LED. For this purpose, in Patent Literature 1, a lens having a circular shape in plan view is disposed on an LED as a chip to control the light transmission directions of the LED chip. The light exit surface of this lens, through which light exits the lens, has a shape such that a portion in the vicinity of the optical axis is a concave surface and a portion outside the concave surface is a convex surface extending continuously from the concave surface.

CITATION LIST

Patent Literature

[Patent Literature 1] JP 3875247 B2

SUMMARY OF INVENTION

Technical Problem

An LED as a chip emits light mostly in the front direction of the LED chip. In the lens disclosed in Patent Literature 1, light emitted in the front direction of the chip is diverged by refraction on the concave surface in the vicinity of the optical axis. As a result, the surface to be illuminated is illuminated to have a wide illuminance distribution with a reduced illuminance in the region near the optical axis.

In the lens disclosed in Patent Literature 1, the light entrance surface is a hemispherical or cylindrical concave surface encapsulating the light source. With such a shape, however, light emitted from the light source at a large angle with respect to the optical axis is incident nearly perpendicularly to the light entrance surface and reaches near the outermost periphery of the light exit surface. Therefore, it is difficult to refract the light at the light exit surface in such a manner that the light travels toward the area to be illuminated. That is, the lens disclosed in Patent Literature 1 cannot distribute the light emitted at a large angle from the light source effectively.

It is an object of the present invention to provide an illuminating lens capable of effectively distributing light emitted at a large angle from a light source as well as widening a range of light transmission directions of the light source. It is another object of the present invention to provide a lighting device, a surface light source, and a liquid crystal display apparatus each including this illuminating lens.

Solution to Problem

In order to achieve the above objects, the present invention provides an illuminating lens for spreading light from a light source in at least one direction perpendicular to a direction of an optical axis so that a surface to be illuminated is illuminated by the spread light. This illuminating lens includes: a light entrance surface through which the light from the light source enters the lens; a light exit surface through which the light that has entered the lens exits the lens; and a bottom surface formed outside the light entrance surface and facing opposite to the light exit surface. The light entrance surface has a first light entrance surface and a second light entrance surface. The first light entrance surface is a curved surface convex toward the light exit surface and perpendicularly intersecting the optical axis, and the second light entrance surface extends outwardly from an edge of the first light entrance surface and is connected obliquely to an inner edge of the bottom surface. In a cross section including the optical axis and taken along the one direction, $\theta 1$ has a negative value at the first light entrance surface and a positive value at the second light entrance surface, where $\theta 1$ is a refraction angle at which virtual light reaching the light entrance surface directly from a starting point on the optical axis corresponding to a position of the light source passes through the light entrance surface, and $\theta 1$ is defined as negative when $\theta 1$ is on the side of the optical axis with respect to a normal to the light entrance surface and as positive when $\theta 1$ is on the opposite side.

The present invention also provides a lighting device including: an LED for emitting light; and an illuminating lens for spreading light from the LED so that a surface to be illuminated is illuminated by the spread light. This illuminating lens is the illuminating lens described above.

The present invention further provides a surface light source including: a plurality of lighting devices arranged in a plane; and a diffusing plate, disposed to cover the plurality of lighting devices, for receiving on one surface thereof light emitted from the plurality of lighting devices and emitting the light from the other surface thereof in a diffused manner. Each of the plurality of lighting devices is the lighting device described above.

Furthermore, the present invention provides a liquid crystal display apparatus including: a liquid crystal panel; and the above-described surface light source disposed behind the liquid crystal panel.

Advantageous Effects of Invention

With the above-described configuration, light concentrated near the center of the light source can be spread at the first light entrance surface. Furthermore, since light emitted at a large angle from the light source can be bent greatly upwardly to the light exit surface side, it is possible to refract the light at the light exit surface so that it can reach a desired area of the surface to be illuminated. Therefore, according to the present invention, the light emitted at a large angle from the light source can be distributed effectively as well as the range of light transmission directions of the light source being widened.

BRIEF DESCRIPTION OF DRAWINGS

FIG. 27 is a diagram showing a structure of a liquid crystal display according to a fourth embodiment of the present invention.

DESCRIPTION OF EMBODIMENTS

Hereinafter, embodiments of the present invention will be described with reference to the accompanying drawings.

First Embodiment

Figure 1:
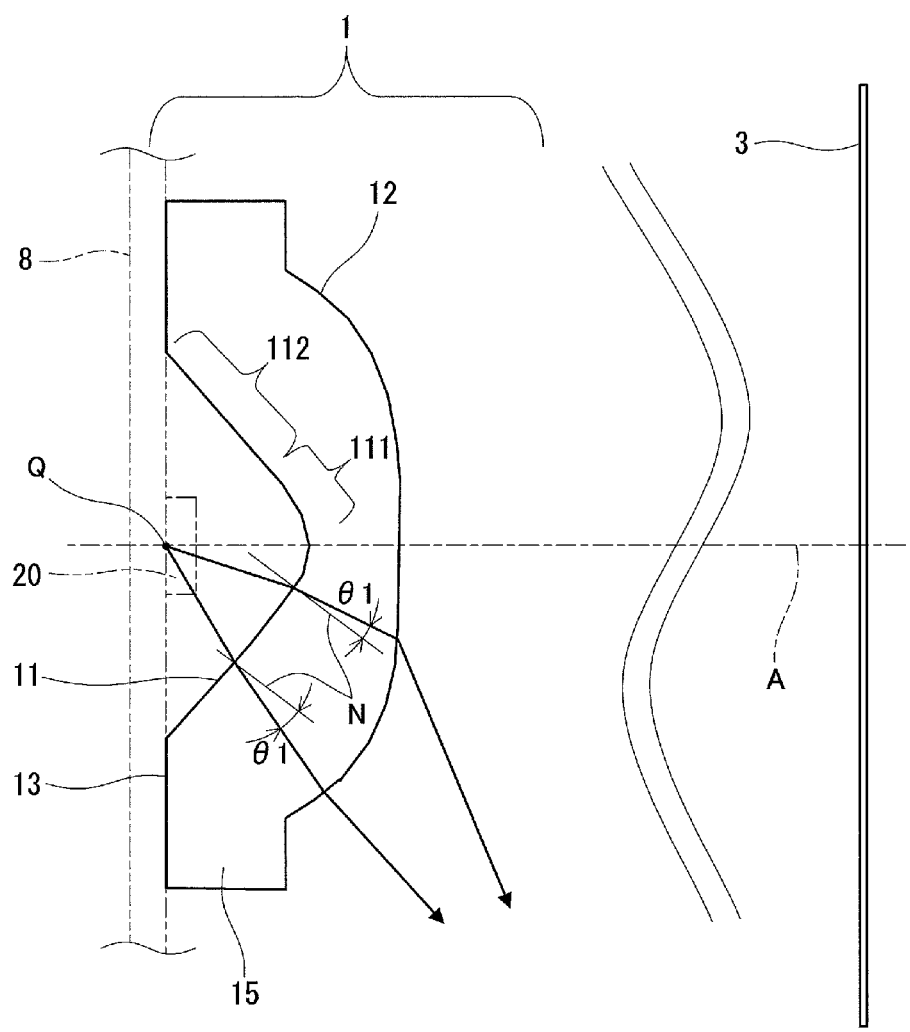
FIG. 1 is a diagram showing a structure of an illuminating lens according to a first embodiment of the present invention.
Figure 2:
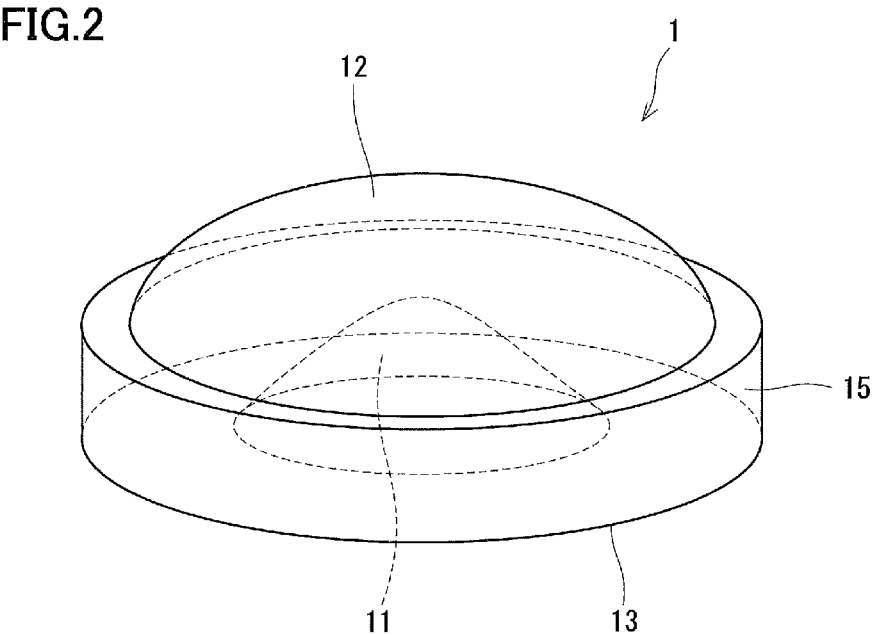
FIG. 2 is a perspective view of the illuminating lens shown in FIG. 1.

FIG. 1 is a diagram showing a structure of an illuminating lens 1 according to a first embodiment of the present invention. The illuminating lens 1, which is disposed between a light source 20 having directivity and a surface to be illuminated 3, spreads light from the light source 20 so that the surface to be illuminated 3 is illuminated by the spread light. That is, the illuminating lens 1 widens the range of light transmission directions of the light source 20. In the present embodiment, as shown in FIG. 2, the illuminating lens 1 has a shape encapsulating the light source 20 completely, and the light from the light source 20 is spread radially around the optical axis A by the illuminating lens 1. In the illuminance distribution on the surface to be illuminated 3, the illuminance is greatest on the optical axis A that is the design center line of the illuminating lens 1 and decreases almost monotonically outward. The light source 20 and the illuminating lens 1 are disposed so that their optical axes coincide with each other.

Specifically, the illuminating lens 1 has a light entrance surface 11 through which the light from the light source 20 enters the lens and a light exit surface 12 through which the light that has entered the lens exits the lens. The illuminating lens 1 has an annular bottom surface 13 formed around the light entrance surface 11 and facing opposite to the light exit surface 12. Furthermore, in the present embodiment, a radially outwardly projecting ring portion 15 is provided between the light exit surface 12 and the bottom surface 13. The peripheral edge of the light exit surface 12 is connected to the outer peripheral edge of the bottom surface 13 with the outer surface of the ring portion 15 having an approximately U-shaped cross section. The ring portion 15 may be omitted. In this case, the peripheral edge of the light exit surface 12 may be connected to the outer peripheral edge of the bottom surface 13 with an end surface having a straight or arcuate cross section.

The light entrance surface 11 is a bowl-shaped continuous concave surface. Preferably, the light entrance surface 11 is rotationally symmetric with respect to the optical axis A, but it need not be rotationally symmetric with respect to the optical axis A. For example, if the light source 20 is rectangular when viewed from the optical axis direction, the light entrance surface 11 may have an elliptical shape extending in the same direction as the light source 20, when viewed from the optical axis direction. The bottom surface 13 surrounding the light entrance surface 11 is flat in the present embodiment.

Figure 3:
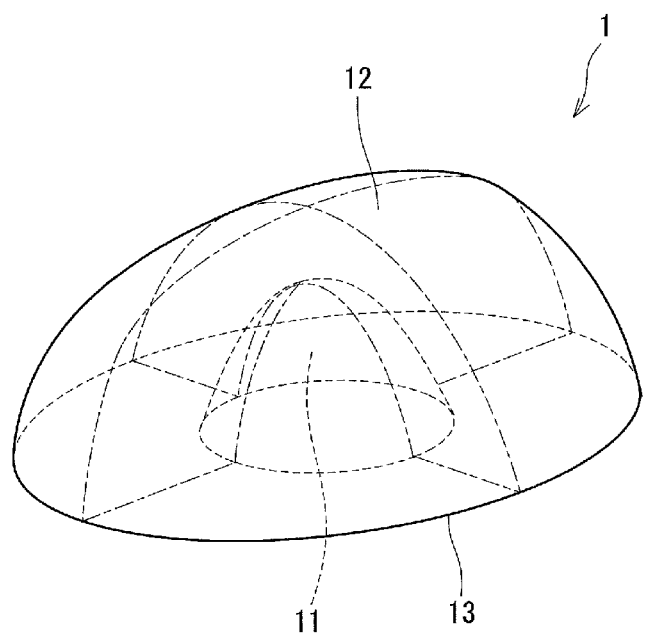
FIG. 3 is a perspective view of a modified illuminating lens.

The light exit surface 12 is a continuous convex surface. Preferably, the light exit surface 12 is rotationally symmetric with respect to the optical axis A, but it need not be rotationally symmetric with respect to the optical axis A. For example, as shown in FIG. 3, the light exit surface 12 may have an elliptical shape when viewed from the optical axis direction. Preferably, the curvature of the central portion of the light exit surface 12 is substantially zero in an arbitrary cross section including the optical axis A. As stated herein, the "central portion" is an area defined by a specified radius from the optical axis A (for example, a radius of one fourth the outermost radius (effective radius) of the light exit surface 12 when viewed in the optical axis direction). The phrase "substantially zero" means that the difference between the maximum sag and the minimum sag in the central portion is 0.1 mm or less, where a sag (sagY) is a distance along the optical axis A between a starting point Q on the optical axis A and an arbitrary point on the light exit surface 12. This configuration makes it easier to form a lens, which makes it possible to manufacture a lens closely conforming to tolerances. The shape of the light exit surface 12 is not limited to this, and it may be a hemispherical convex surface, for example.

The contour of the illuminating lens 1 in plan view need not be rotationally symmetric with respect to the optical axis A. For example, the ring portion 15 may have a pair of flat portions that are parallel to each other across the optical axis A so that the illuminating lens 1 has an oval shape when viewed from the optical axis direction.

The light from the light source 20 enters the illuminating lens 1 through the light entrance surface 11, exits the lens 1 through the light exit surface 12, and then reaches the surface to be illuminated 3. The light emitted from the light source 20 is spread by the actions of the light entrance surface 11 and the light exit surface 12, and reaches a large area of the surface to be illuminated 3.

As the light source 20, for example, an LED can be used. An LED usually is covered with a sealing resin to avoid contact with air. As a conventional sealing resin for an LED, epoxy resin, silicone rubber, or the like is used.

The illuminating lens 1 is made of a transparent material having a specified refractive index. The refractive index of the transparent material is, for example, about 1.4 to 2.0. Examples of such a transparent material include resins such as epoxy resin, silicone resin, acrylic resin, and polycarbonate, glasses, and rubbers such as silicone rubber. Among these, epoxy resin, silicone rubber, or the like, which is used as a sealing resin for LEDs, is used preferably.

Next, the details of the light entrance surface 11 are described.

The light entrance surface 11 has a first light entrance surface 111 and a second light entrance surface 112. The first light entrance surface 111 is a curved surface convex toward the light exit surface 12 and perpendicularly intersects the optical axis A. The second light entrance surface 112 extends linearly outwardly from the peripheral edge of the first light entrance surface 111 and is connected obliquely to the inner peripheral edge of the bottom surface 13. Light emitted from the light source 20 at a small angle with respect to the optical axis A reaches the first light entrance surface 111, and light emitted from the light source 20 at a large angle with respect to the optical axis A reaches the second light entrance surface 112.

For example, the light entrance surface 11 may have a hyperboloidal shape. In this case, the shape of the second light entrance surface 112 is a slightly curved arc in a cross section including the optical axis A. The shape of the second light entrance surface 112 may be straight in a cross section including the optical axis A. In the case where the light entrance surface 11 is rotationally symmetric with respect to the optical axis A, the second light entrance surface 112 extends radially outwardly from the peripheral edge of the first light exit surface 111 and is connected obliquely to the inner peripheral edge of the bottom surface 13.

In an arbitrary cross section including the optical axis A, $\theta_1$ has a negative value at the first light entrance surface 111 and a positive value at the second light entrance surface 112, where $\theta_1$ is a refraction angle at which virtual light reaching the light entrance surface 11 directly from the starting point Q on the optical axis A corresponding to the position of the light source 20 passes through the light entrance surface 11, and $\theta_1$ is defined as negative when $\theta_1$ is on the side of the optical axis A with respect to a normal N to the light entrance surface 11 and as positive when $\theta_1$ is on the opposite side.

The "starting point Q on the optical axis A corresponding to the position of the light source 20" is a point that can be regarded as the center of light emitted from the light source 20, and can be set at a desired position. The starting point Q is, however, preferably located in the same plane as the bottom surface 13 or located closer to the first light entrance surface 111 than on the bottom surface 13. In the present embodiment, it is assumed that the light source 20 is mounted on the substrate 8 and the bottom surface 13 of the illuminating lens 1 is bonded to this substrate 8, and the starting point Q is located in the same plane as the bottom surface 13.

In an arbitrary cross section including the optical axis A, an angle between the optical axis A and a tangent at an arbitrary point on the second light entrance surface 112 preferably is 20° or more and 70° or less, from the viewpoint of light distributing characteristics. More preferably, the angle is 30° or more and 50° or less.

With the illuminating lens 1 configured as described above, light concentrated near the center of the light source 20 can be spread at the first light entrance surface 111. Furthermore, since light emitted at a large angle from the light source 20 can be bent greatly upwardly to the light exit surface 12 side, it is possible to refract the light at the light exit surface 12 so that it can reach a desired area of the surface to be illuminated 3. Therefore, according to the illuminating lens 1 of the present embodiment, the light emitted at a large angle from the light source 20 can be distributed effectively as well as the range of light transmission directions of the light source 20 being widened.

Preferably, in the illuminating lens 1, the following inequality (1) holds:

$$0.5 < sagY_{60}/sagY_0 < 0.8 \quad (1)$$

where in an arbitrary cross section including the optical axis A, when θi is an angle between the optical axis A and a straight line connecting an arbitrary point on the light exit surface 12 and the starting point Q on the optical axis A, sagY is a distance along the optical axis A between the starting point Q on the optical axis A and the arbitrary point on the light exit surface 12, $sagY_0$ is a sagY value at an angle θi of 0°, and $sagY_{60}$ is a sagY value at an angle θi of 60°.

If the shape of the light entrance surface 11 is designed as in the present embodiment, the distance along the optical axis A between the starting point Q on the optical axis A and the outermost periphery of the light exit surface 12 can be increased. Thereby, the edge of the illuminating lens 1 can be thicker to some extent, and the illuminating lens 1 can be injection molded easily. Furthermore, if the distance along the optical axis A between the starting point Q on the optical axis A and the outermost periphery of the light exit surface 12 is increased, a space can be formed between the bottom surface 13 and the substrate 8 on which the light source 20 is mounted, for example. With such a space, air heated by the light source 20 can escape through the space, and an excessive rise in temperature for the light source 20 can be avoided. When the lower limit of the inequality (1) is exceeded, the edge of the illuminating lens 1 becomes too thin. When the upper limit of the inequality (1) is exceeded, the size (for example, the diameter when viewed from the optical axis direction) of the illuminating lens 1 becomes too large.

Figure 4:
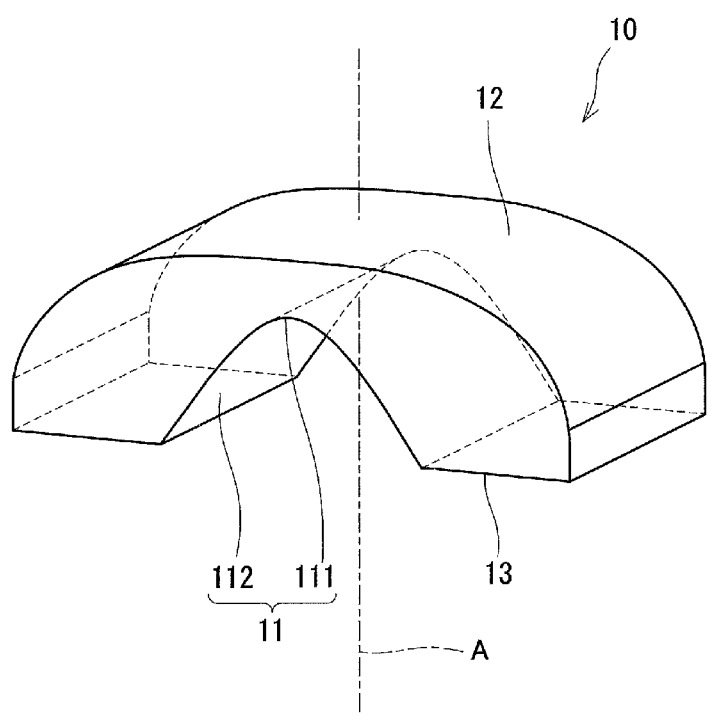
FIG. 4 is a perspective view of another modified illuminating lens.

As the illuminating lens of the present invention, any lens may be used as long as it spreads light from the light source 20 in at least one direction perpendicular to the optical axis direction. The illuminating lens is not limited to a lens that spreads the light from the light source 20 radially around the optical axis A. For example, it is also possible to adopt an illuminating lens 10 having a two-forked shape straddling a light source (not shown), as shown in FIG. 4. With this illuminating lens 10, light from the light source is spread only in the first direction perpendicular to the optical axis direction. In this case, the light entrance surface 11 is a cylindrical concave surface extending in the second direction perpendicular to the optical axis direction and the first direction, and the bottom surface 13 is located on both sides of the light entrance surface in the first direction. The second light entrance surface 112 extends linearly outwardly from both edges of the first light entrance surface 111 in the first direction and is connected obliquely to the inner edges of the bottom surface 13 in the first direction. In this case, a long light source extending in the second direction is used preferably.

It is preferable that also in the illuminating lens 10, the curvature of the central portion of the light exit surface 12 be substantially zero in the cross section including the optical axis A and taken along the first direction that is the light spreading direction (that is, the same cross section as that in FIG. 1). In the cross section including the optical axis A and taken along the first direction, the angle between the optical axis A and a tangent at an arbitrary point on the second light entrance surface 112 preferably is 20° or more and 70° or less, and more preferably 30° or more and 50° or less. Furthermore, it is preferable that the illuminating lens 10 satisfy the above inequality (1): $0.5 < sagY_{60}/sagY_0 < 0.8$ in the cross section including the optical axis and taken along the first direction.

The illuminating lens of the present invention is applicable not only to LEDs but also to other light sources (such as lasers and organic ELs).

Second Embodiment

Figure 5:
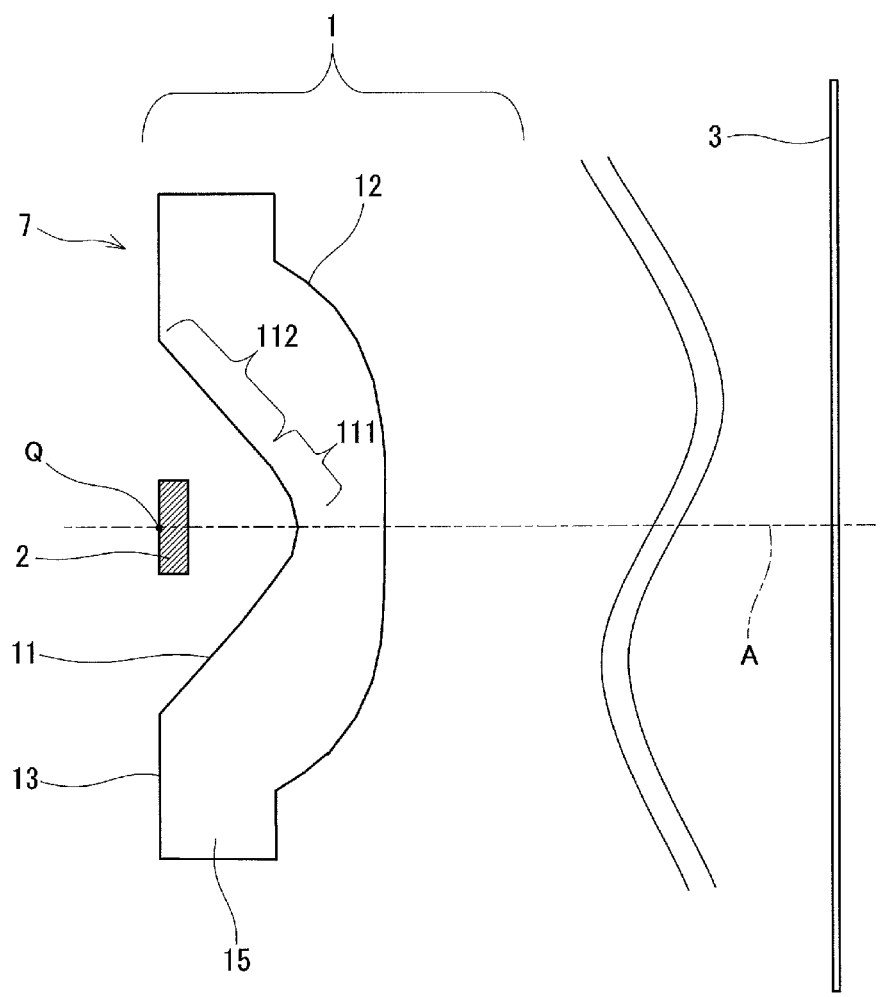
FIG. 5 is a diagram showing a structure of a lighting device according to a second embodiment of the present invention.

FIG. 5 is a diagram showing a structure of a lighting device 7 according to a second embodiment of the present invention. This lighting device 7 includes an LED 2 for emitting light, and the illuminating lens 1 of the first embodiment for spreading light from the light source radially (see FIG. 1 to FIG. 3), as an illuminating lens for spreading light from the LED 2 so that the surface to be illuminated 3 is illuminated by the spread light. The lighting device 7 may include the illuminating lens 10 for spreading light from the light source in only one direction (see FIG. 4) instead of the illuminating lens 1.

The LED 2 is disposed to be spaced from the light entrance surface 11 of the illuminating lens 1. Preferably, the second light entrance surface 112 of the illuminating lens 1 extends in the optical axis direction beyond the light emitting surface of the LED 2 in order to respond to the variations in the level of the light emitting surface of the LED 2. In the present embodiment, the surface opposite to the light emitting surface of the LED 2 is located in the same plane as the bottom surface 13 of the illuminating lens 1, and a point of intersection of the optical axis A and the surface opposite to the light emitting surface of the LED 2 (in other words, the surface of the substrate on which the LED 2 is mounted) is the starting point Q described in the first embodiment. The light that has exited the illuminating lens 1 through the light exit surface 12 reaches the surface to be illuminated 3, and thus illuminates the surface to be illuminated 3.

Light emission in the LED 2 does not have directivity, but the light emitting region thereof has a refractive index of 2.0 or more. Therefore, when light enters a low refractive region, the refraction of the light at the interface causes the light to have the maximum intensity in the normal direction of the interface and a lower intensity as the angle of the light with respect to the normal direction increases. As described above, since the LED 2 in fact has directivity, it is necessary to use the illuminating lens 1 to widen the range of light transmission directions of the LED 2 so that a larger area is illuminated by the light.

Figure 6:
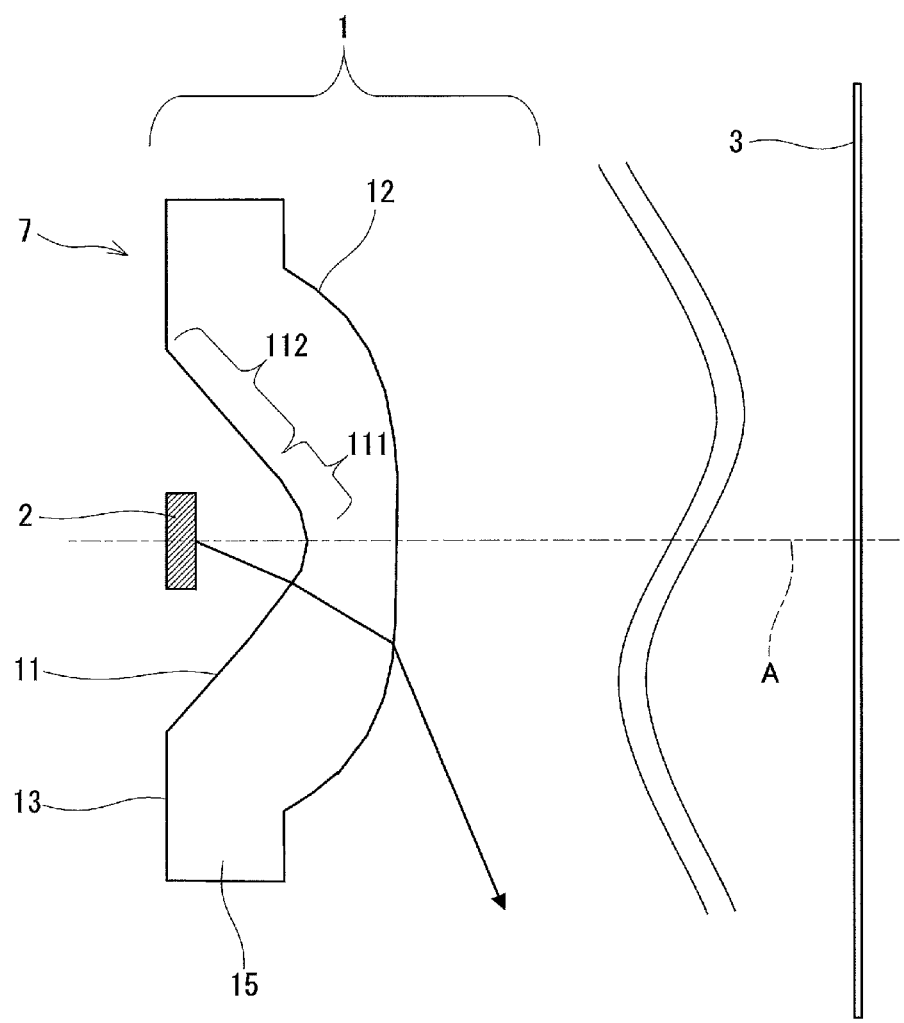
FIG. 6 is a diagram showing a path of a light ray that reaches a first light entrance surface in the lighting device according to the second embodiment of the present invention.
Figure 7:
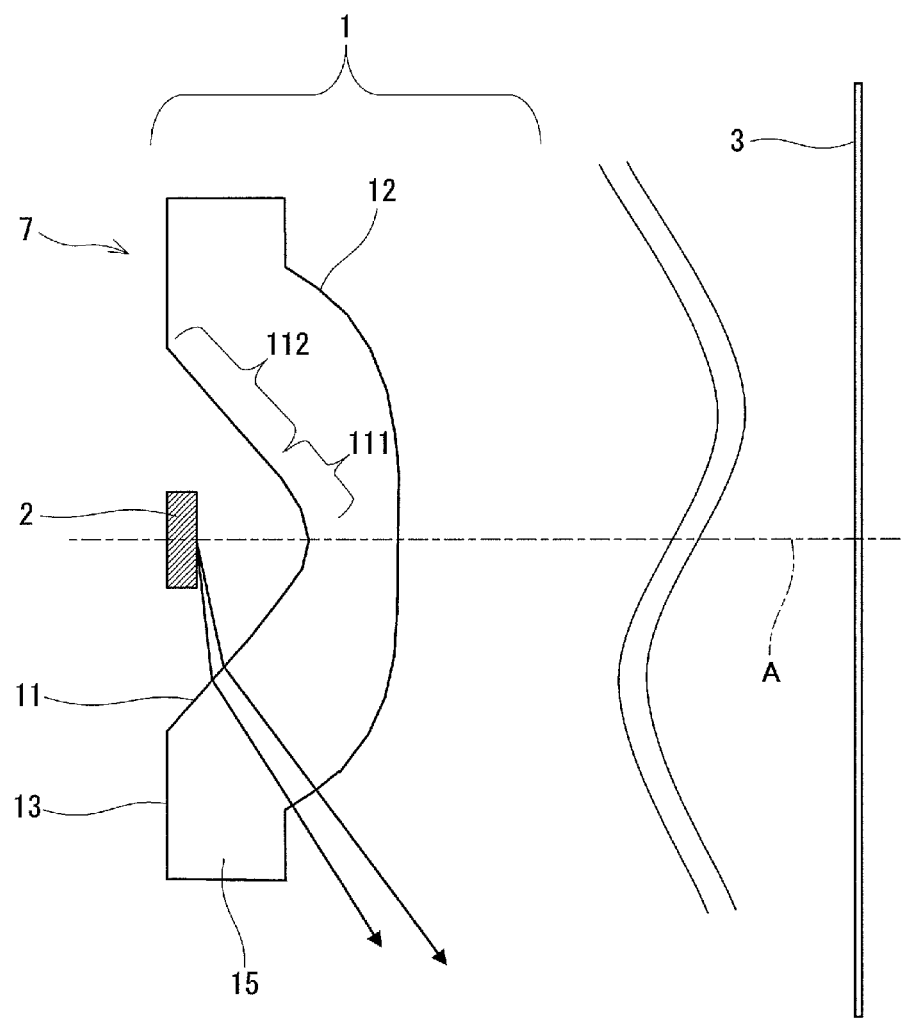
FIG. 7 is a diagram showing paths of light rays that reach a second light entrance surface in the lighting device according to the second embodiment of the present invention.

FIG. 6 and FIG. 7 are diagrams showing the paths of light rays in the lighting device 7. FIG. 6 shows the path of a light ray that is emitted from the LED 2 at a small angle with respect to the optical axis A and reaches the first light entrance surface 111. The light ray emitted from the LED 2 passes through the first light entrance surface 111 while being refracted in the direction away from the optical axis A, and then reaches the light exit surface 12. Upon reaching the light exit surface 12, the light ray passes through the light exit surface 12 while being refracted, and then reaches the surface to be illuminated 3. FIG. 7 shows the paths of light rays that are emitted from the LED 2 at larger angles with respect to the optical axis A and reach the second light entrance surface 112. The light rays emitted from the LED 2 pass through the second light entrance surface 112 while being refracted in the direction closer to the optical axis A, and then reach the light exit surface 12. Upon reaching the light exit surface 12, the light rays pass through the light exit surface 12 while being refracted, and then reach the surface to be illuminated 3.

Figure 8:
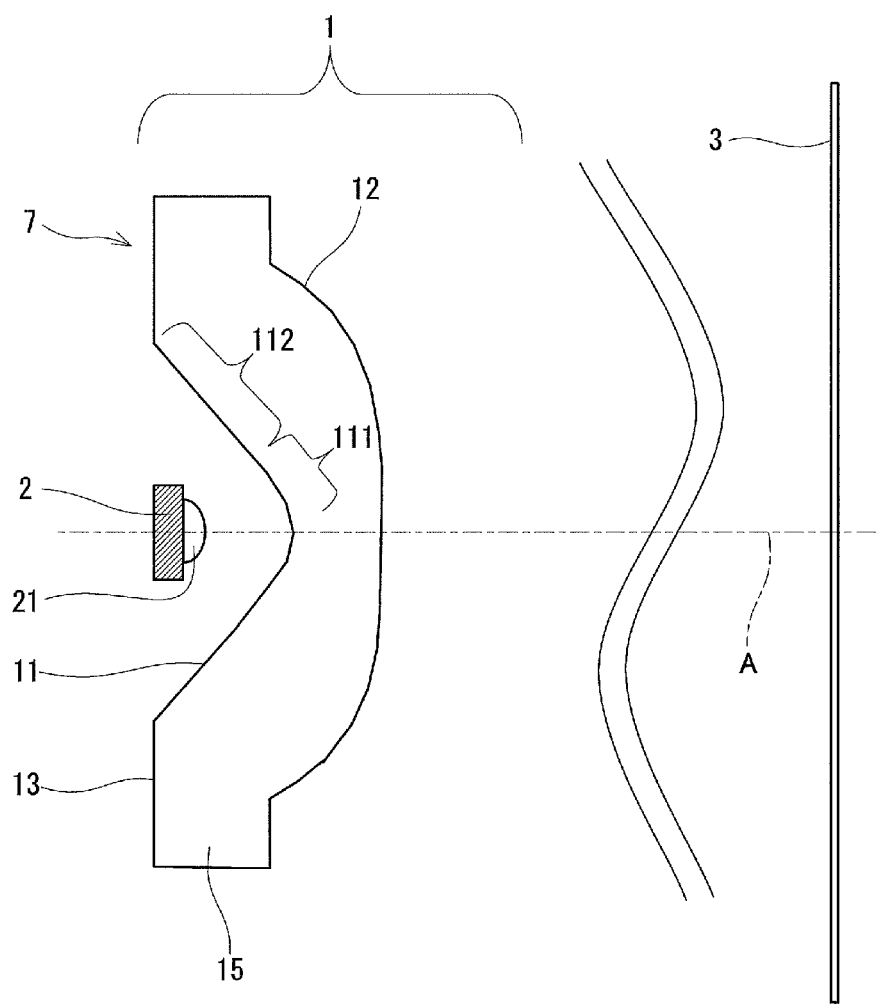
FIG. 8 is a diagram showing a structure of a modified lighting device.

A dome-shaped sealing portion 21 made of a sealing resin may be formed on the light emitting surface of the LED 2, as shown in FIG. 8. With this sealing portion 21, the range of light transmission directions of the light source can be widened further, and the light ejecting efficiency also can be increased.

Hereinafter, Examples 1 to 3 of the second embodiment of the present invention are given as specific numerical examples of the present invention. In Examples 1 and 2, the illuminating lens 1 for spreading light from the light source radially is used, and in Example 3, the illuminating lens 10 for spreading light from the light source in only one direction is used.

Figure 9:
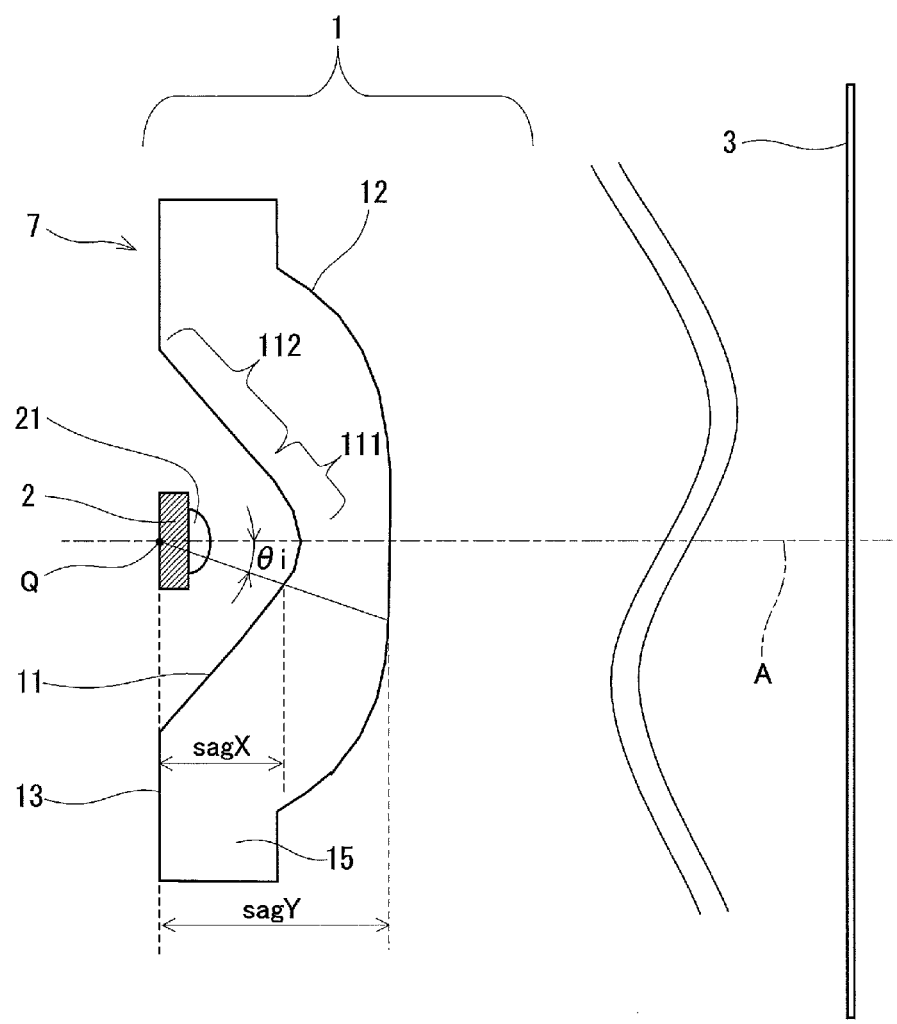
FIG. 9 is a diagram showing a structure of a lighting device of Example 1.
Figure 10:
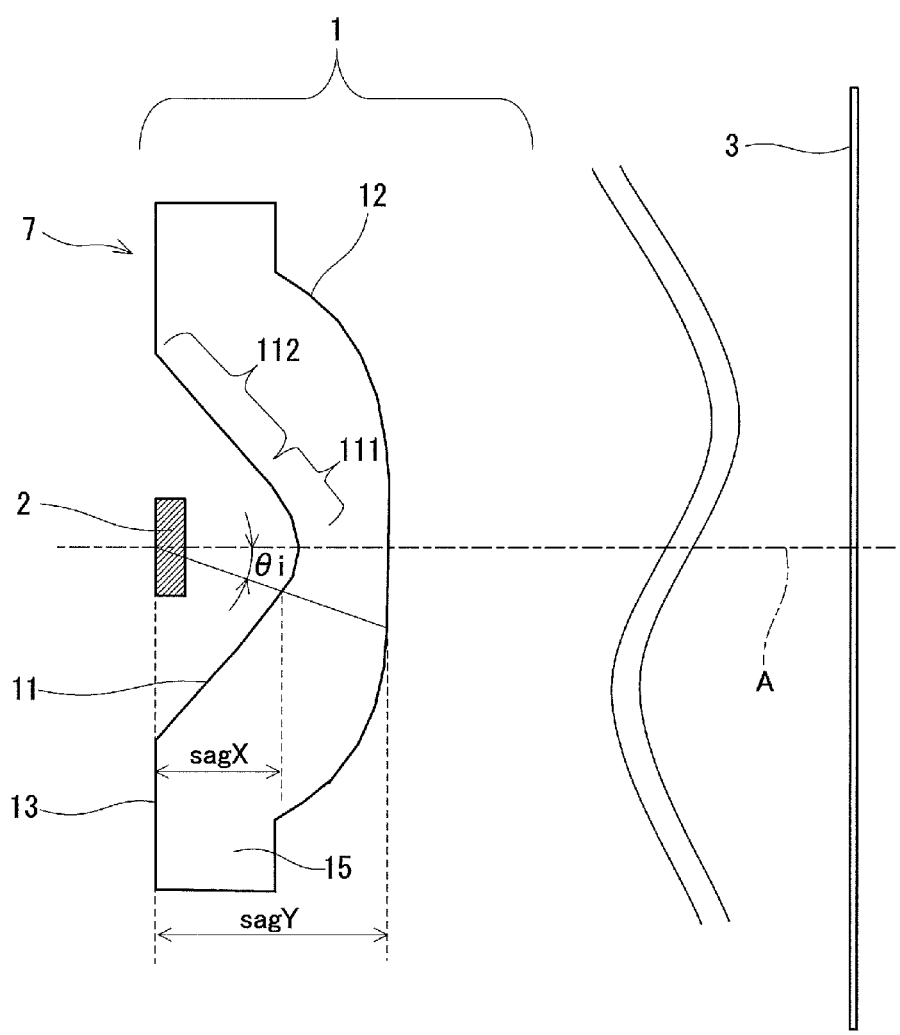
FIG. 10 is a diagram showing a structure of a lighting device of Example 2.

FIG. 9 is a diagram showing a structure of a lighting device of Example 1. FIG. 10 is a diagram showing a structure of a lighting device of Example 2. Since a lighting device of Example 3 has a cross section as shown in FIG. 10, and extends in the direction perpendicular to this cross section, a diagram showing the structure thereof is not shown here. Examples 1 to 3 are examples of a lighting device designed to widen the range of light transmission directions of a general-purpose LED as a light source. In Example 1, the package size of the LED is 3.0 mm×2.0 mm. In Example 2, the package size of the LED is 5.8 mm×3.4 mm. In Example 3, the package size of the LED is 3.0 mm×3.0 mm. In Example 1, a dome-shaped sealing portion is formed on the light emitting surface of the LED.

In FIG. 9 and FIG. 10, $\theta i$ is an angle between the optical axis A and a straight line connecting the starting point Q on the optical axis A, an arbitrary point on the light entrance surface 11, and an arbitrary point on the light exit surface 12. Furthermore, in FIG. 9 and FIG. 10, sagX is a distance along the optical axis A between the starting point Q on the optical axis A and the arbitrary point on the light entrance surface 11, and sagY is a distance along the optical axis A between the starting point Q on the optical axis A and the arbitrary point on the light exit surface 12.

Example 1

Table 1 below shows specific numerical values in Example 1.

TABLE 1

| Light entrance surface | | Light exit surface | |
|---|---|---|---|
| $\theta i$ | sagX | $\theta i$ | sagY |
| 0.00 | 3.600 | 0.00 | 5.450 |
| 0.80 | 3.598 | 0.53 | 5.450 |
| 1.59 | 3.594 | 1.05 | 5.450 |
| 2.40 | 3.586 | 1.58 | 5.449 |
| 3.20 | 3.575 | 2.10 | 5.449 |
| 4.02 | 3.562 | 2.63 | 5.448 |
| 4.84 | 3.545 | 3.15 | 5.447 |
| 5.67 | 3.526 | 3.68 | 5.446 |
| 6.51 | 3.504 | 4.20 | 5.445 |
| 7.37 | 3.480 | 4.73 | 5.443 |
| 8.24 | 3.454 | 5.25 | 5.441 |
| 9.12 | 3.426 | 5.77 | 5.439 |
| 10.02 | 3.396 | 6.30 | 5.437 |
| 10.94 | 3.363 | 6.82 | 5.434 |
| 11.87 | 3.330 | 7.34 | 5.432 |
| 12.83 | 3.294 | 7.87 | 5.429 |
| 13.80 | 3.258 | 8.39 | 5.426 |
| 14.79 | 3.220 | 8.91 | 5.424 |
| 15.80 | 3.180 | 9.43 | 5.421 |

TABLE 1-continued

| Light entrance surface | | Light exit surface | |
|---|---|---|---|
| $\theta i$ | sagX | $\theta i$ | sagY |
| 16.83 | 3.140 | 9.95 | 5.418 |
| 17.89 | 3.099 | 10.46 | 5.415 |
| 18.96 | 3.056 | 10.98 | 5.413 |
| 20.05 | 3.013 | 11.49 | 5.410 |
| 21.17 | 2.969 | 12.01 | 5.407 |
| 22.31 | 2.925 | 12.52 | 5.405 |
| 23.47 | 2.879 | 13.03 | 5.403 |
| 24.65 | 2.833 | 13.53 | 5.401 |
| 25.85 | 2.787 | 14.04 | 5.398 |
| 27.07 | 2.740 | 14.54 | 5.396 |
| 28.31 | 2.692 | 15.05 | 5.394 |
| 29.57 | 2.644 | 15.54 | 5.393 |
| 30.85 | 2.596 | 16.04 | 5.391 |
| 32.14 | 2.547 | 16.54 | 5.389 |
| 33.45 | 2.497 | 17.03 | 5.387 |
| 34.78 | 2.448 | 17.52 | 5.386 |
| 36.12 | 2.398 | 18.01 | 5.384 |
| 37.48 | 2.348 | 18.49 | 5.382 |
| 38.85 | 2.297 | 18.98 | 5.380 |
| 40.22 | 2.246 | 19.46 | 5.379 |
| 41.61 | 2.195 | 19.93 | 5.377 |
| 43.01 | 2.144 | 20.41 | 5.375 |
| 44.41 | 2.093 | 20.88 | 5.373 |
| 45.82 | 2.041 | 21.36 | 5.371 |
| 47.23 | 1.989 | 21.83 | 5.368 |
| 48.64 | 1.937 | 22.29 | 5.366 |
| 50.05 | 1.885 | 22.76 | 5.363 |
| 51.45 | 1.833 | 23.22 | 5.361 |
| 52.86 | 1.780 | 23.68 | 5.358 |
| 54.26 | 1.727 | 24.14 | 5.355 |
| 55.65 | 1.675 | 24.60 | 5.352 |
| 57.03 | 1.622 | 25.05 | 5.348 |
| 58.40 | 1.569 | 25.51 | 5.344 |
| 59.76 | 1.516 | 25.96 | 5.341 |
| 61.11 | 1.462 | 26.41 | 5.337 |
| 62.44 | 1.409 | 26.86 | 5.332 |
| 63.76 | 1.355 | 27.30 | 5.328 |
| 65.06 | 1.302 | 27.74 | 5.323 |
| 66.35 | 1.248 | 28.19 | 5.318 |
| 67.61 | 1.194 | 28.63 | 5.313 |
| 68.86 | 1.141 | 29.07 | 5.308 |
| 70.09 | 1.087 | 29.50 | 5.302 |
| 71.29 | 1.033 | 29.94 | 5.296 |
| 72.48 | 0.979 | 30.37 | 5.290 |
| 73.64 | 0.925 | 30.80 | 5.283 |
| 74.78 | 0.870 | 31.24 | 5.276 |
| 75.90 | 0.816 | 31.67 | 5.269 |
| 77.00 | 0.762 | 32.09 | 5.262 |
| 78.07 | 0.707 | 32.52 | 5.254 |
| 79.13 | 0.653 | 32.95 | 5.246 |
| 80.16 | 0.599 | 33.37 | 5.237 |
| 81.16 | 0.544 | 33.80 | 5.228 |
| 82.15 | 0.490 | 34.22 | 5.219 |
| 83.11 | 0.435 | 34.65 | 5.209 |
| 84.05 | 0.380 | 35.07 | 5.199 |
| 84.97 | 0.326 | 35.49 | 5.189 |
| 85.87 | 0.271 | 35.91 | 5.178 |
| 86.75 | 0.216 | 36.34 | 5.166 |
| 87.60 | 0.161 | 36.76 | 5.154 |
| 88.44 | 0.106 | 37.18 | 5.142 |
| 89.25 | 0.051 | 37.60 | 5.129 |
| | | 38.02 | 5.115 |
| | | 38.45 | 5.101 |
| | | 38.87 | 5.087 |
| | | 39.29 | 5.072 |
| | | 39.72 | 5.056 |
| | | 40.14 | 5.040 |
| | | 40.56 | 5.023 |
| | | 40.99 | 5.006 |
| | | 41.41 | 4.988 |
| | | 41.84 | 4.970 |
| | | 42.27 | 4.951 |
| | | 42.70 | 4.932 |
| | | 43.12 | 4.912 |
| | | 43.55 | 4.891 |

TABLE 1-continued

| Light entrance surface | | Light exit surface | |
|---|---|---|---|
| θi | sagX | θi | sagY |
| | | 43.98 | 4.870 |
| | | 44.42 | 4.848 |
| | | 44.85 | 4.826 |
| | | 45.28 | 4.803 |
| | | 45.72 | 4.779 |
| | | 46.15 | 4.755 |
| | | 46.59 | 4.730 |
| | | 47.03 | 4.704 |
| | | 47.47 | 4.678 |
| | | 47.92 | 4.651 |
| | | 48.36 | 4.623 |
| | | 48.81 | 4.594 |
| | | 49.27 | 4.564 |
| | | 49.72 | 4.534 |
| | | 50.18 | 4.502 |
| | | 50.64 | 4.470 |
| | | 51.11 | 4.437 |
| | | 51.58 | 4.402 |
| | | 52.05 | 4.367 |
| | | 52.53 | 4.330 |
| | | 53.02 | 4.292 |
| | | 53.51 | 4.254 |
| | | 54.00 | 4.213 |
| | | 54.50 | 4.172 |
| | | 55.01 | 4.130 |
| | | 55.52 | 4.086 |
| | | 56.04 | 4.040 |
| | | 56.57 | 3.994 |
| | | 57.10 | 3.946 |
| | | 57.65 | 3.896 |
| | | 58.20 | 3.845 |
| | | 58.76 | 3.791 |
| | | 59.33 | 3.736 |
| | | 59.91 | 3.679 |
| | | 60.51 | 3.619 |
| | | 61.12 | 3.557 |
| | | 61.75 | 3.493 |
| | | 62.39 | 3.425 |
| | | 63.06 | 3.354 |
| | | 63.75 | 3.280 |
| | | 64.46 | 3.202 |
| | | 65.19 | 3.121 |
| | | 65.95 | 3.035 |
| | | 66.72 | 2.947 |
| | | 67.52 | 2.855 |
| | | 68.33 | 2.761 |
| | | 69.15 | 2.666 |
| | | 69.95 | 2.573 |
| | | 70.73 | 2.482 |
| | | 71.45 | 2.400 |
| | | 72.07 | 2.329 |
| | | 72.56 | 2.278 |
| | | 72.84 | 2.254 |
| | | 72.85 | 2.268 |
| | | 72.48 | 2.336 |

Figure 11:
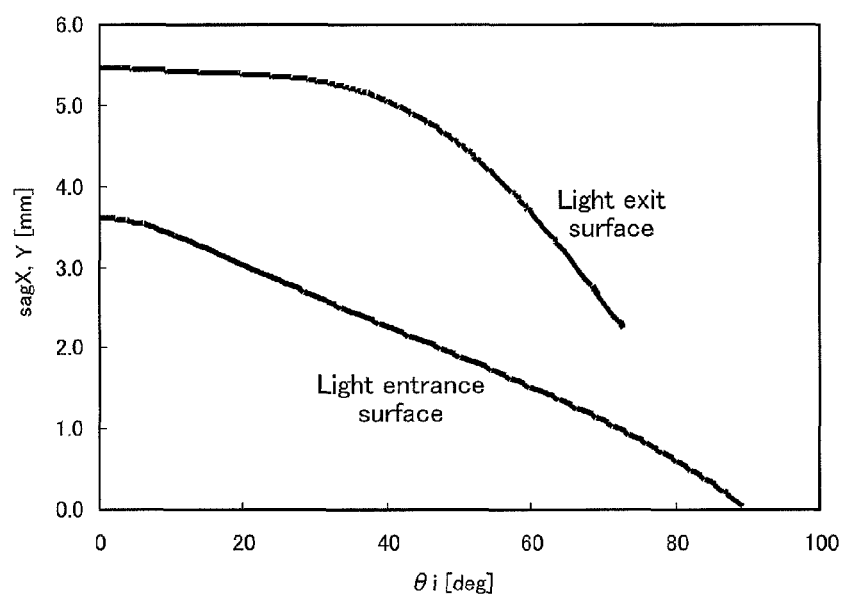
FIG. 11 is a graph showing a relationship between $\theta i$ and sagX and a relationship between $\theta i$ and sagY (a graph obtained by plotting the values in Table 1) to represent the shapes of the light entrance surface and the light exit surface of the illuminating lens in a lighting device of Example 1.
Figure 12:
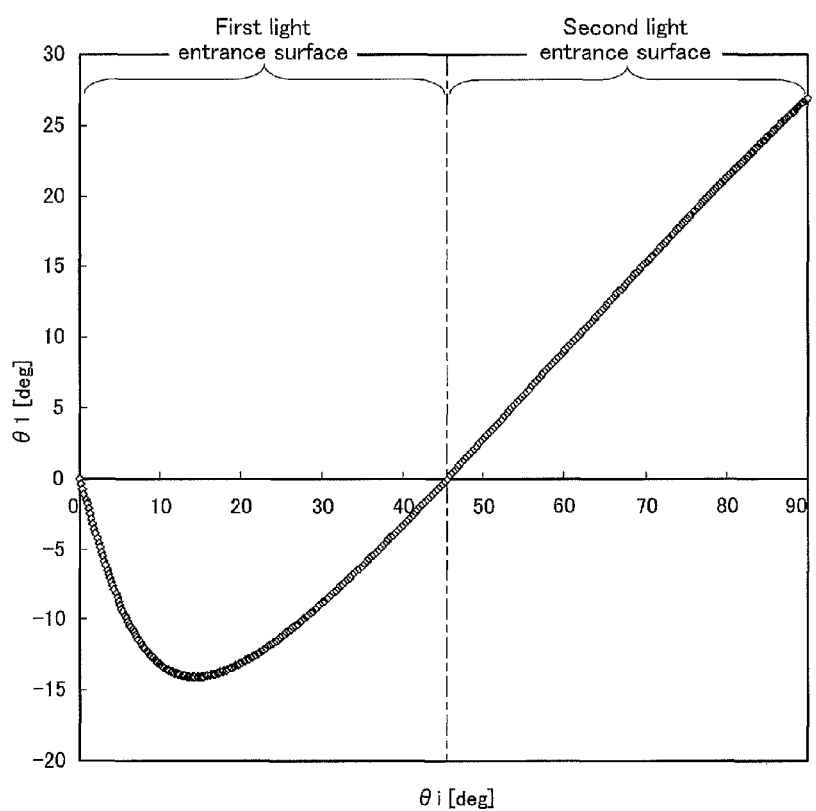
FIG. 12 is a graph showing a relationship between $\theta i$ and $\theta 1$ in the lighting device of Example 1.

FIG. 11 is a graph obtained by plotting the values of θi, sagX, and sagY in Table 1. FIG. 12 is a graph showing a relationship between θi and θ1, where θ1 is a refraction angle of virtual light from the starting point Q at the light entrance surface 11. FIG. 12 shows that in Example 1, the sign of θ1 on the first light entrance surface 111 is opposite to that on the second light entrance surface 112.

Figure 13A:
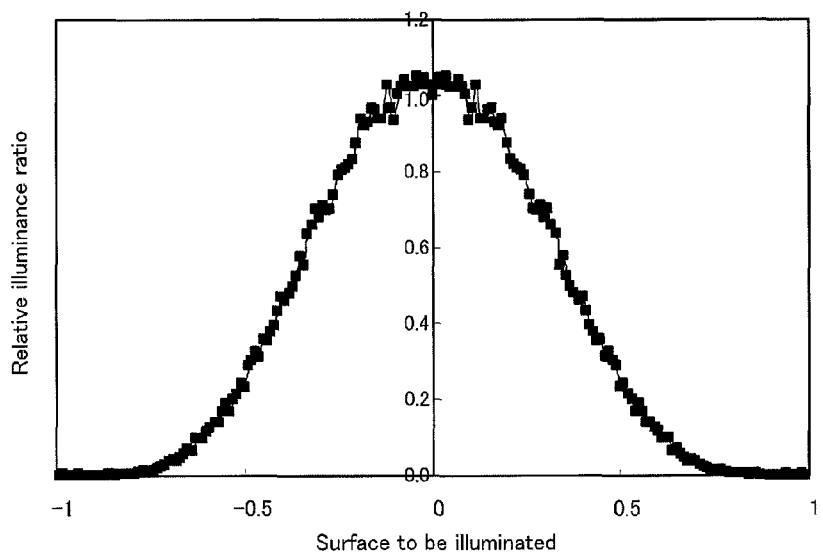
FIG. 13A shows an illuminance distribution obtained when the lighting device of Example 1 is used.
Figure 13B:
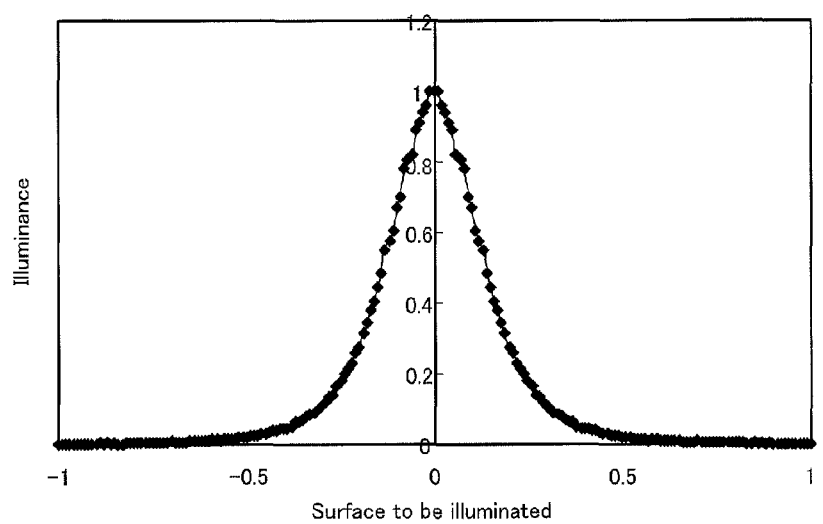
FIG. 13B is an illuminance distribution obtained when only an LED is used to confirm the effect of Example 1.

FIG. 13A shows an illuminance distribution on the surface to be illuminated. This illuminance distribution is calculated on the assumption that the lighting device of Example 1 is used and the surface to be illuminated is placed at a distance of 23 mm from the light emitting surface of the LED. FIG. 13B shows an illuminance distribution on the surface to be illuminated. This illuminance distribution is calculated on the assumption that only the same LED as used to obtain the graph of FIG. 13A (the LED with the sealing portion 21 on its light emitting surface) is used and the surface to be illuminated is placed at a distance of 23 mm from the light emitting surface of the LED. FIG. 13A and FIG. 13B each show a curve indicating the distribution of illuminances on the surface to be illuminated when the illuminances are normalized with respect to the illuminance as 1 at the center of the optical axis. A comparison between FIG. 13A and FIG. 13B shows that the illuminating lens 1 having a shape encapsulating the light source is completely effective in increasing the illuminated area of the surface to be illuminated.

In Example 1, the value of $sagY_{60}/sagY_0$ of the light exit surface 12 is 0.675.

Example 2

Table 2 below shows specific numerical values in Example 2.

TABLE 2

| Light entrance surface | | Light exit surface | |
|---|---|---|---|
| θi | sagX | θi | sagY |
| 0.00 | 3.900 | 0.00 | 5.400 |
| 0.73 | 3.899 | 0.53 | 5.400 |
| 1.47 | 3.896 | 1.06 | 5.400 |
| 2.21 | 3.891 | 1.59 | 5.400 |
| 2.95 | 3.883 | 2.12 | 5.400 |
| 3.69 | 3.874 | 2.65 | 5.400 |
| 4.44 | 3.863 | 3.18 | 5.400 |
| 5.19 | 3.850 | 3.71 | 5.400 |
| 5.95 | 3.835 | 4.24 | 5.400 |
| 6.72 | 3.818 | 4.76 | 5.400 |
| 7.50 | 3.800 | 5.29 | 5.400 |
| 8.28 | 3.780 | 5.82 | 5.400 |
| 9.07 | 3.758 | 6.34 | 5.400 |
| 9.87 | 3.735 | 6.86 | 5.400 |
| 10.68 | 3.711 | 7.39 | 5.400 |
| 11.50 | 3.685 | 7.91 | 5.400 |
| 12.34 | 3.658 | 8.43 | 5.399 |
| 13.18 | 3.629 | 8.95 | 5.399 |
| 14.04 | 3.600 | 9.46 | 5.399 |
| 14.90 | 3.569 | 9.98 | 5.399 |
| 15.78 | 3.538 | 10.49 | 5.399 |
| 16.67 | 3.505 | 11.01 | 5.398 |
| 17.58 | 3.472 | 11.52 | 5.398 |
| 18.50 | 3.438 | 12.03 | 5.397 |
| 19.42 | 3.403 | 12.54 | 5.397 |
| 20.37 | 3.367 | 13.04 | 5.396 |
| 21.32 | 3.331 | 13.55 | 5.396 |
| 22.29 | 3.294 | 14.05 | 5.395 |
| 23.27 | 3.256 | 14.55 | 5.394 |
| 24.26 | 3.218 | 15.05 | 5.393 |
| 25.26 | 3.179 | 15.55 | 5.392 |
| 26.27 | 3.140 | 16.04 | 5.390 |
| 27.30 | 3.100 | 16.54 | 5.389 |
| 28.34 | 3.060 | 17.03 | 5.388 |
| 29.38 | 3.019 | 17.52 | 5.386 |
| 30.44 | 2.978 | 18.01 | 5.384 |
| 31.51 | 2.937 | 18.49 | 5.382 |
| 32.58 | 2.895 | 18.98 | 5.379 |
| 33.66 | 2.853 | 19.46 | 5.377 |
| 34.76 | 2.810 | 19.94 | 5.374 |
| 35.85 | 2.768 | 20.42 | 5.371 |
| 36.96 | 2.725 | 20.90 | 5.368 |
| 38.07 | 2.681 | 21.38 | 5.364 |
| 39.18 | 2.638 | 21.85 | 5.361 |
| 40.30 | 2.594 | 22.33 | 5.357 |
| 41.42 | 2.550 | 22.80 | 5.352 |
| 42.55 | 2.506 | 23.27 | 5.348 |
| 43.67 | 2.461 | 23.74 | 5.343 |
| 44.80 | 2.417 | 24.21 | 5.337 |
| 45.93 | 2.372 | 24.68 | 5.332 |
| 47.05 | 2.327 | 25.15 | 5.326 |

TABLE 2-continued

| Light entrance surface | | Light exit surface | |
|---|---|---|---|
| θi | sagX | θi | sagY |
| 48.18 | 2.282 | 25.61 | 5.319 |
| 49.30 | 2.236 | 26.08 | 5.313 |
| 50.42 | 2.191 | 26.54 | 5.306 |
| 51.53 | 2.145 | 27.00 | 5.298 |
| 52.64 | 2.100 | 27.47 | 5.291 |
| 53.74 | 2.054 | 27.93 | 5.282 |
| 54.84 | 2.008 | 28.39 | 5.274 |
| 55.93 | 1.962 | 28.85 | 5.265 |
| 57.01 | 1.915 | 29.31 | 5.255 |
| 58.08 | 1.869 | 29.77 | 5.246 |
| 59.14 | 1.822 | 30.22 | 5.235 |
| 60.19 | 1.776 | 30.68 | 5.225 |
| 61.24 | 1.729 | 31.14 | 5.213 |
| 62.27 | 1.682 | 31.60 | 5.202 |
| 63.29 | 1.636 | 32.06 | 5.189 |
| 64.29 | 1.589 | 32.52 | 5.177 |
| 65.29 | 1.542 | 32.97 | 5.164 |
| 66.27 | 1.494 | 33.43 | 5.150 |
| 67.24 | 1.447 | 33.89 | 5.136 |
| 68.20 | 1.400 | 34.35 | 5.121 |
| 69.14 | 1.353 | 34.81 | 5.106 |
| 70.07 | 1.305 | 35.27 | 5.090 |
| 70.99 | 1.258 | 35.73 | 5.074 |
| 71.89 | 1.210 | 36.19 | 5.057 |
| 72.77 | 1.163 | 36.66 | 5.039 |
| 73.65 | 1.115 | 37.12 | 5.021 |
| 74.51 | 1.067 | 37.58 | 5.002 |
| 75.35 | 1.020 | 38.05 | 4.983 |
| 76.18 | 0.972 | 38.52 | 4.963 |
| 76.99 | 0.924 | 38.99 | 4.942 |
| 77.80 | 0.876 | 39.46 | 4.921 |
| 78.58 | 0.828 | 39.93 | 4.898 |
| 79.36 | 0.780 | 40.40 | 4.876 |
| 80.11 | 0.732 | 40.88 | 4.852 |
| 80.86 | 0.684 | 41.36 | 4.828 |
| 81.59 | 0.636 | 41.84 | 4.803 |
| 82.31 | 0.588 | 42.32 | 4.777 |
| 83.01 | 0.539 | 42.80 | 4.751 |
| 83.70 | 0.491 | 43.29 | 4.723 |
| 84.38 | 0.443 | 43.78 | 4.695 |
| 85.05 | 0.394 | 44.28 | 4.666 |
| 85.70 | 0.346 | 44.78 | 4.636 |
| 86.34 | 0.298 | 45.28 | 4.605 |
| 86.96 | 0.249 | 45.78 | 4.573 |
| 87.58 | 0.201 | 46.29 | 4.540 |
| 88.18 | 0.152 | 46.81 | 4.507 |
| 88.77 | 0.104 | 47.32 | 4.472 |
| 89.35 | 0.055 | 47.85 | 4.436 |
| 89.92 | 0.007 | 48.38 | 4.398 |
| | | 48.91 | 4.360 |
| | | 49.45 | 4.320 |
| | | 50.00 | 4.280 |
| | | 50.55 | 4.237 |
| | | 51.11 | 4.194 |
| | | 51.68 | 4.149 |
| | | 52.26 | 4.102 |
| | | 52.85 | 4.054 |
| | | 53.44 | 4.004 |
| | | 54.05 | 3.953 |
| | | 54.66 | 3.900 |
| | | 55.29 | 3.845 |
| | | 55.93 | 3.788 |
| | | 56.58 | 3.728 |
| | | 57.25 | 3.667 |
| | | 57.93 | 3.603 |
| | | 58.62 | 3.537 |
| | | 59.33 | 3.469 |
| | | 60.06 | 3.398 |
| | | 60.81 | 3.324 |
| | | 61.57 | 3.249 |
| | | 62.34 | 3.171 |
| | | 63.12 | 3.092 |
| | | 63.91 | 3.012 |
| | | 64.69 | 2.932 |
| | | 65.46 | 2.853 |
| | | 66.21 | 2.777 |
| | | 66.92 | 2.706 |
| | | 67.56 | 2.643 |
| | | 68.10 | 2.593 |
| | | 68.51 | 2.560 |

Figure 14:
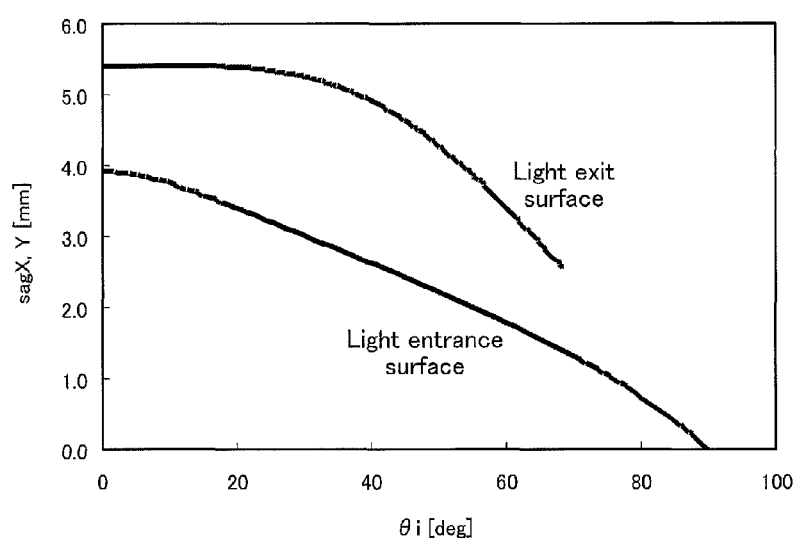
FIG. 14 is a graph showing a relationship between $\theta i$ and sagX and a relationship between $\theta i$ and sagY (a graph obtained by plotting the values in Table 2) to represent the shapes of the light entrance surface and the light exit surface of the illuminating lens in a lighting device of Example 2.
Figure 15:
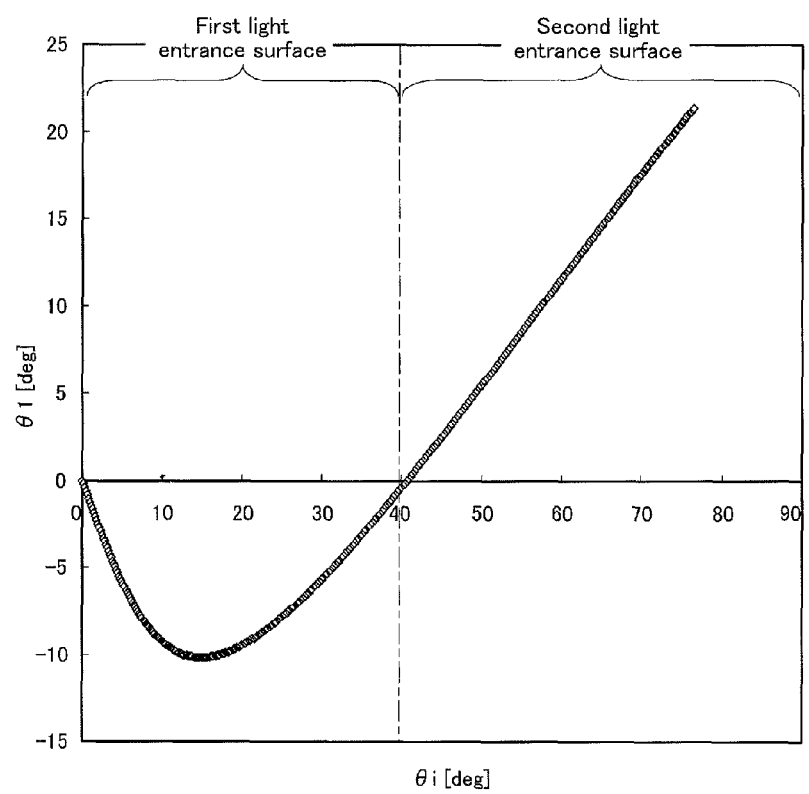
FIG. 15 is a graph showing a relationship between $\theta i$ and $\theta 1$ in the lighting device of Example 2.

FIG. 14 is a graph obtained by plotting the values of θi, sagX, and sagY in Table 2. FIG. 15 is a graph showing a relationship between θi and θ1, where θ1 is a refraction angle of virtual light from the starting point Q at the light entrance surface 11. FIG. 15 shows that in Example 2, the sign of θ1 on the first light entrance surface 111 is opposite to that on the second light entrance surface 112 as in Example 1 described above.

Figure 16A:
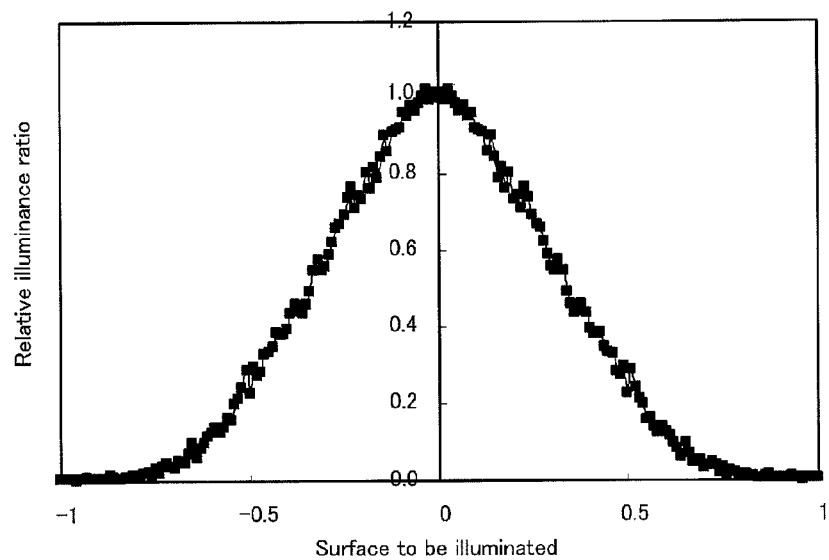
FIG. 16A shows an illuminance distribution obtained when the lighting device of Example 2 is used.
Figure 16B:
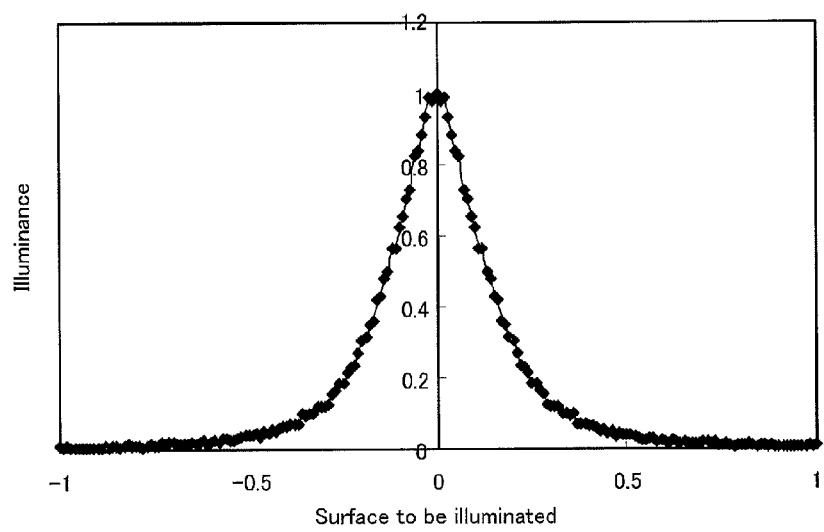
FIG. 16B is an illuminance distribution obtained when only an LED is used to confirm the effect of Example 2.

FIG. 16A shows an illuminance distribution on the surface to be illuminated. This illuminance distribution is calculated on the assumption that the lighting device of Example 2 is used and the surface to be illuminated is placed at a distance of 23 mm from the light emitting surface of the LED. FIG. 16B shows an illuminance distribution on the surface to be illuminated. This illuminance distribution is calculated on the assumption that only the same LED as used to obtain the graph of FIG. 16A (the LED without the sealing portion 21 on its light emitting surface) is used and the surface to be illuminated is placed at a distance of 23 mm from the light emitting surface of the LED. FIG. 16A and FIG. 16B each show a curve indicating the distribution of illuminances on the surface to be illuminated when the illuminances are normalized with respect to the illuminance as 1 at the center of the optical axis, as in FIG. 13A and FIG. 13B. A comparison between FIG. 16A and FIG. 16B shows that the illuminating lens 1 having a shape encapsulating the light source is completely effective in increasing the illuminated area of the surface to be illuminated.

In Example 2, the value of $sagY_{60}/sagY_0$ of the light exit surface 12 is 0.629.

Example 3

Table 3 below shows specific numerical values in Example 3.

TABLE 3

| Light entrance surface | | Light exit surface | |
|---|---|---|---|
| θi | sagX | θi | sagY |
| 0.00 | 4.500 | 0.00 | 6.000 |
| 0.64 | 4.499 | 0.48 | 6.000 |
| 1.27 | 4.495 | 0.95 | 6.000 |
| 1.91 | 4.490 | 1.43 | 6.000 |
| 2.56 | 4.482 | 1.91 | 6.000 |
| 3.20 | 4.472 | 2.39 | 6.000 |
| 3.85 | 4.459 | 2.86 | 6.000 |
| 4.50 | 4.445 | 3.34 | 6.000 |
| 5.16 | 4.428 | 3.81 | 6.000 |
| 5.83 | 4.409 | 4.29 | 6.000 |
| 6.50 | 4.388 | 4.76 | 6.000 |
| 7.18 | 4.365 | 5.24 | 6.000 |
| 7.87 | 4.340 | 5.71 | 6.000 |
| 8.57 | 4.313 | 6.18 | 6.000 |
| 9.28 | 4.284 | 6.66 | 5.999 |
| 10.00 | 4.253 | 7.13 | 5.999 |

TABLE 3-continued

| Light entrance surface | | Light exit surface | |
|---|---|---|---|
| θi | sagX | θi | sagY |
| 10.73 | 4.220 | 7.60 | 5.999 |
| 11.48 | 4.185 | 8.07 | 5.999 |
| 12.24 | 4.149 | 8.53 | 5.998 |
| 13.01 | 4.110 | 9.00 | 5.998 |
| 13.80 | 4.071 | 9.47 | 5.997 |
| 14.61 | 4.029 | 9.93 | 5.997 |
| 15.43 | 3.986 | 10.40 | 5.996 |
| 16.27 | 3.941 | 10.86 | 5.996 |
| 17.12 | 3.895 | 11.32 | 5.995 |
| 18.00 | 3.848 | 11.78 | 5.994 |
| 18.89 | 3.799 | 12.24 | 5.993 |
| 19.81 | 3.749 | 12.70 | 5.992 |
| 20.74 | 3.697 | 13.15 | 5.991 |
| 21.70 | 3.644 | 13.61 | 5.990 |
| 22.68 | 3.590 | 14.06 | 5.988 |
| 23.68 | 3.535 | 14.52 | 5.987 |
| 24.70 | 3.479 | 14.97 | 5.985 |
| 25.75 | 3.421 | 15.42 | 5.984 |
| 26.82 | 3.363 | 15.86 | 5.982 |
| 27.91 | 3.303 | 16.31 | 5.980 |
| 29.03 | 3.243 | 16.76 | 5.978 |
| 30.18 | 3.181 | 17.20 | 5.976 |
| 31.35 | 3.119 | 17.64 | 5.973 |
| 32.54 | 3.056 | 18.09 | 5.971 |
| 33.76 | 2.992 | 18.53 | 5.968 |
| 35.01 | 2.927 | 18.97 | 5.965 |
| 36.27 | 2.862 | 19.40 | 5.963 |
| 37.57 | 2.795 | 19.84 | 5.959 |
| 38.88 | 2.728 | 20.27 | 5.956 |
| 40.22 | 2.660 | 20.71 | 5.953 |
| 41.58 | 2.592 | 21.14 | 5.949 |
| 42.97 | 2.523 | 21.57 | 5.946 |
| 44.37 | 2.453 | 21.99 | 5.942 |
| 45.80 | 2.383 | 22.42 | 5.938 |
| 47.24 | 2.312 | 22.85 | 5.933 |
| 48.70 | 2.241 | 23.27 | 5.929 |
| 50.17 | 2.169 | 23.70 | 5.924 |
| 51.66 | 2.096 | 24.12 | 5.919 |
| 53.16 | 2.023 | 24.54 | 5.914 |
| 54.67 | 1.950 | 24.96 | 5.909 |
| 56.18 | 1.876 | 25.37 | 5.904 |
| 57.71 | 1.801 | 25.79 | 5.898 |
| 59.24 | 1.726 | 26.21 | 5.892 |
| 60.76 | 1.651 | 26.62 | 5.886 |
| 62.29 | 1.575 | 27.03 | 5.880 |
| 63.82 | 1.499 | 27.44 | 5.873 |
| 65.34 | 1.423 | 27.85 | 5.866 |
| 66.86 | 1.346 | 28.26 | 5.859 |
| 68.37 | 1.269 | 28.67 | 5.851 |
| 69.87 | 1.192 | 29.08 | 5.844 |
| 71.35 | 1.114 | 29.49 | 5.836 |
| 72.82 | 1.036 | 29.89 | 5.827 |
| 74.28 | 0.957 | 30.30 | 5.819 |
| 75.72 | 0.878 | 30.70 | 5.810 |
| 77.14 | 0.799 | 31.11 | 5.801 |
| 78.53 | 0.720 | 31.51 | 5.791 |
| 79.91 | 0.640 | 31.91 | 5.781 |
| 81.27 | 0.561 | 32.31 | 5.771 |
| | | 32.71 | 5.760 |
| | | 33.11 | 5.749 |
| | | 33.51 | 5.738 |
| | | 33.91 | 5.726 |
| | | 34.31 | 5.714 |
| | | 34.71 | 5.702 |
| | | 35.11 | 5.689 |
| | | 35.51 | 5.676 |
| | | 35.91 | 5.663 |
| | | 36.30 | 5.649 |
| | | 36.70 | 5.634 |
| | | 37.10 | 5.620 |
| | | 37.50 | 5.604 |
| | | 37.90 | 5.589 |
| | | 38.29 | 5.573 |
| | | 38.69 | 5.556 |
| | | 39.09 | 5.539 |
| | | 39.49 | 5.522 |
| | | 39.89 | 5.504 |
| | | 40.29 | 5.486 |
| | | 40.68 | 5.467 |
| | | 41.08 | 5.448 |
| | | 41.49 | 5.428 |
| | | 41.89 | 5.408 |
| | | 42.29 | 5.387 |
| | | 42.69 | 5.366 |
| | | 43.09 | 5.344 |
| | | 43.50 | 5.322 |
| | | 43.90 | 5.299 |
| | | 44.31 | 5.275 |
| | | 44.72 | 5.251 |
| | | 45.13 | 5.227 |
| | | 45.54 | 5.201 |
| | | 45.95 | 5.175 |
| | | 46.36 | 5.149 |
| | | 46.78 | 5.122 |
| | | 47.20 | 5.094 |
| | | 47.62 | 5.065 |
| | | 48.04 | 5.036 |
| | | 48.46 | 5.006 |
| | | 48.89 | 4.975 |
| | | 49.31 | 4.943 |
| | | 49.75 | 4.911 |
| | | 50.18 | 4.878 |
| | | 50.62 | 4.844 |
| | | 51.06 | 4.809 |
| | | 51.50 | 4.773 |
| | | 51.95 | 4.736 |
| | | 52.40 | 4.698 |
| | | 52.85 | 4.659 |
| | | 53.31 | 4.620 |
| | | 53.77 | 4.579 |
| | | 54.24 | 4.537 |
| | | 54.72 | 4.493 |
| | | 55.20 | 4.449 |
| | | 55.68 | 4.403 |
| | | 56.17 | 4.356 |
| | | 56.67 | 4.307 |
| | | 57.18 | 4.257 |
| | | 57.69 | 4.205 |
| | | 58.22 | 4.152 |
| | | 58.75 | 4.096 |
| | | 59.29 | 4.039 |
| | | 59.84 | 3.980 |
| | | 60.41 | 3.918 |
| | | 60.99 | 3.855 |
| | | 61.58 | 3.788 |
| | | 62.19 | 3.719 |
| | | 62.81 | 3.647 |
| | | 63.46 | 3.571 |
| | | 64.13 | 3.492 |
| | | 64.82 | 3.408 |
| | | 65.55 | 3.320 |
| | | 66.30 | 3.226 |
| | | 67.10 | 3.125 |
| | | 67.95 | 3.017 |
| | | 68.86 | 2.901 |
| | | 69.83 | 2.773 |
| | | 70.89 | 2.633 |
| | | 72.05 | 2.478 |
| | | 73.34 | 2.304 |
| | | 74.79 | 2.107 |

Figure 17:
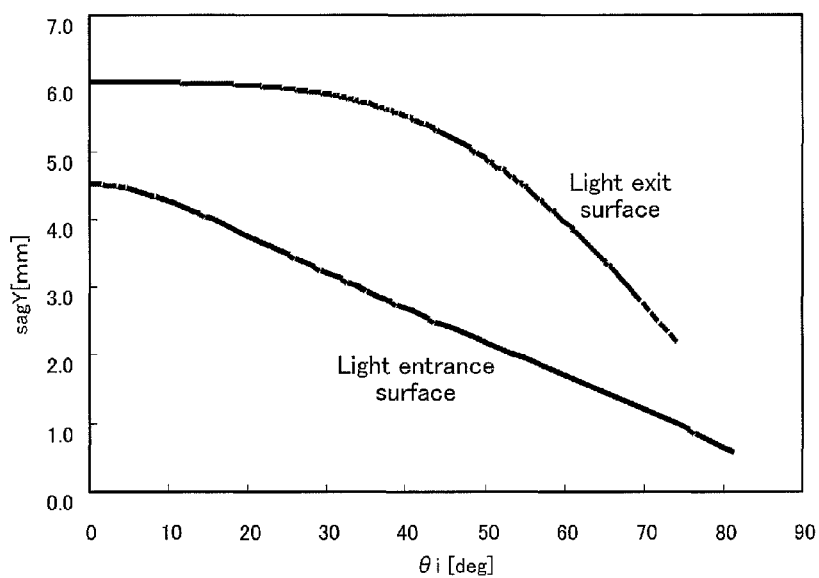
FIG. 17 is a graph showing a relationship between $\theta i$ and sagX and a relationship between $\theta i$ and sagY (a graph obtained by plotting the values in Table 3) to represent the shapes of the light entrance surface and the light exit surface of the illuminating lens in a lighting device of Example 3.
Figure 18:
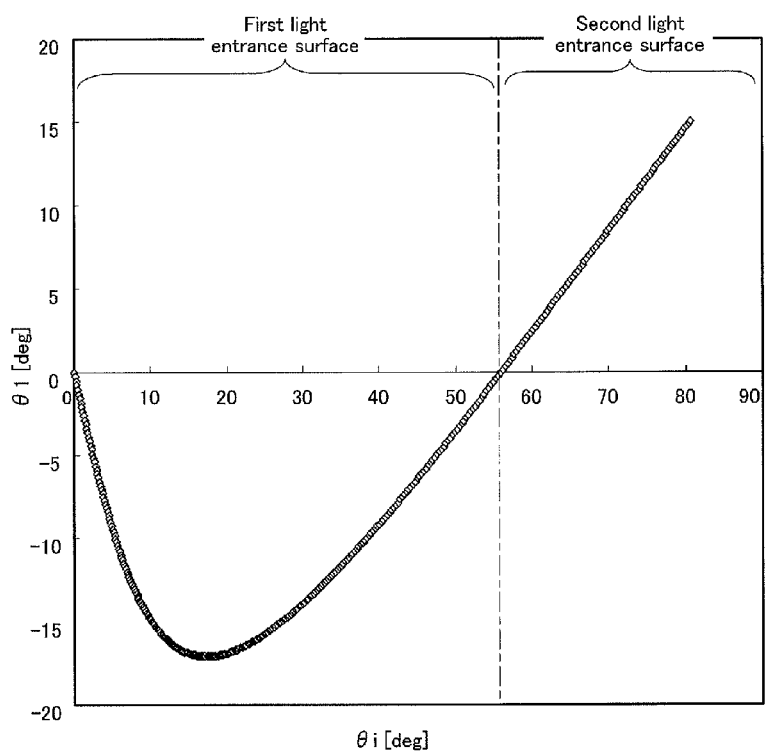
FIG. 18 is a graph showing a relationship between $\theta i$ and $\theta 1$ in the lighting device of Example 3.

FIG. 17 is a graph obtained by plotting the values of θi, sagX, and sagY in Table 3. FIG. 18 is a graph showing a relationship between θi and θ1, where θ1 is a refraction angle of virtual light from the starting point Q at the light entrance surface 11. FIG. 18 shows that in Example 3, the sign of θ1 on the first light entrance surface 111 is opposite to that on the second light entrance surface 112 as in Example 1 described above.

Figure 19A:
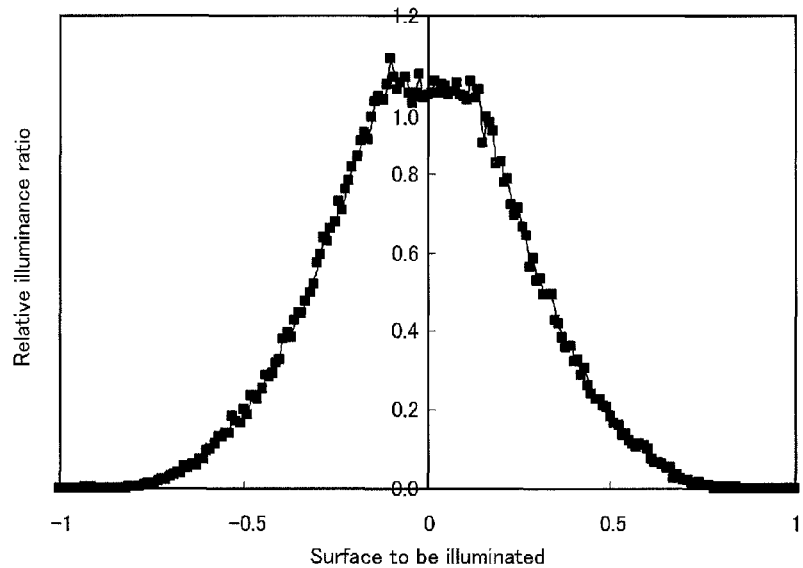
FIG. 19A shows an illuminance distribution obtained when the lighting device of Example 3 is used.
Figure 19B:
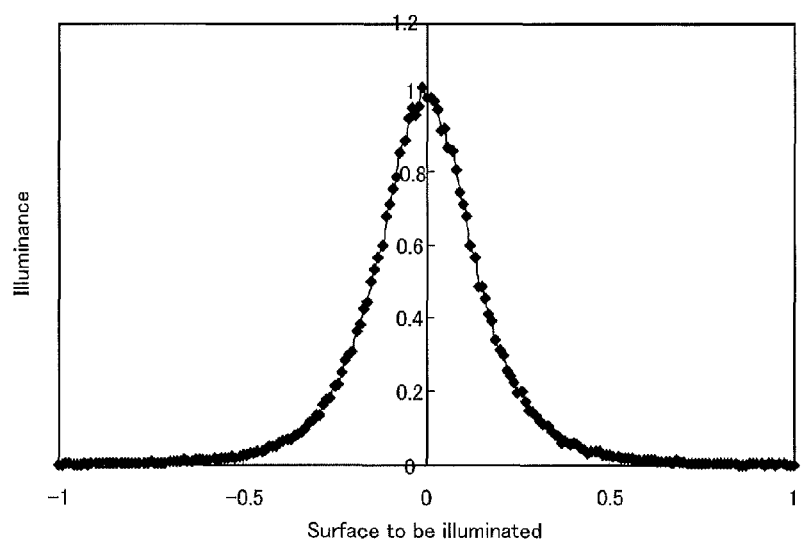
FIG. 19B is an illuminance distribution obtained when only an LED is used to confirm the effect of Example 3.

FIG. 19A shows an illuminance distribution on the surface to be illuminated. This illuminance distribution is calculated on the assumption that the lighting device of Example 3 is used and the surface to be illuminated is placed at a distance of 23 mm from the light emitting surface of the LED. FIG. 19B shows an illuminance distribution on the surface to be illuminated. This illuminance distribution is calculated on the assumption that only the same LED as used to obtain the graph of FIG. 19A (the LED without the sealing portion 21 on its light emitting surface) is used and the surface to be illuminated is placed at a distance of 23 mm from the light emitting surface of the LED. FIG. 19A and FIG. 19B each show a curve indicating the distribution of illuminances on the surface to be illuminated when the illuminances are normalized with respect to the illuminance as 1 at the center of the optical axis, as in FIG. 13A and FIG. 13B. A comparison between FIG. 19A and FIG. 19B shows that the illuminating lens 10 having a two-forked shape straddling the light source is effective in increasing the illuminated area of the surface to be illuminated.

In Example 3, the value of $sagY_{60}/sagY_0$ of the light exit surface 12 is 0.660.

Third Embodiment

Figure 20:
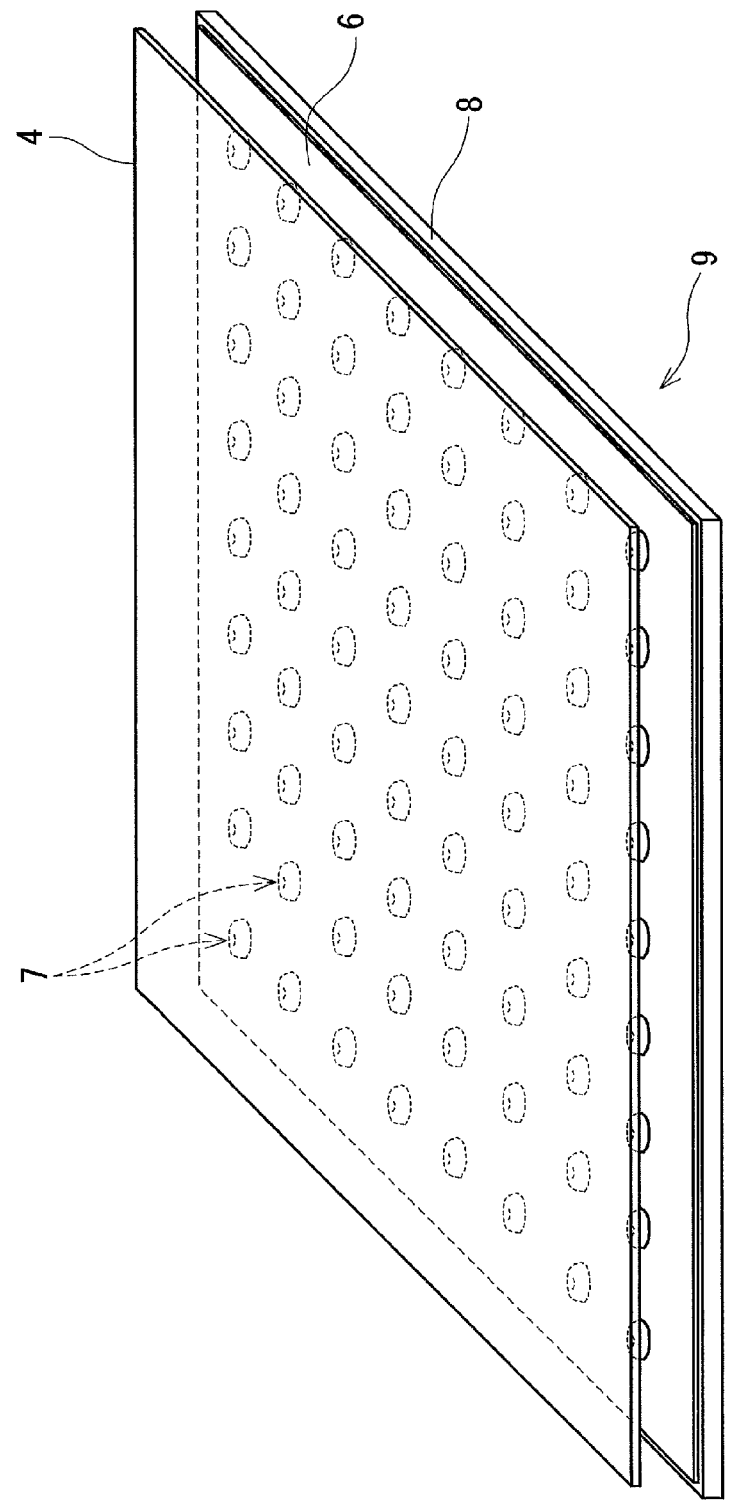
FIG. 20 is a diagram showing a structure of a surface light source according to a third embodiment of the present invention.

FIG. 20 is a diagram showing a structure of a surface light source 9 according to a third embodiment of the present invention. This surface light source 9 includes a plurality of lighting devices 7 of the second embodiment arranged in a plane, and a diffusing plate 4 disposed to cover the plurality of lighting devices 7. Each of the lighting devices 7 includes the illuminating lens 1 for spreading light from the light source radially (see FIG. 1 to FIG. 3). The lighting devices 7 may be arranged in a matrix as shown in FIG. 20. They also may be arranged in a staggered manner.

Figure 21:
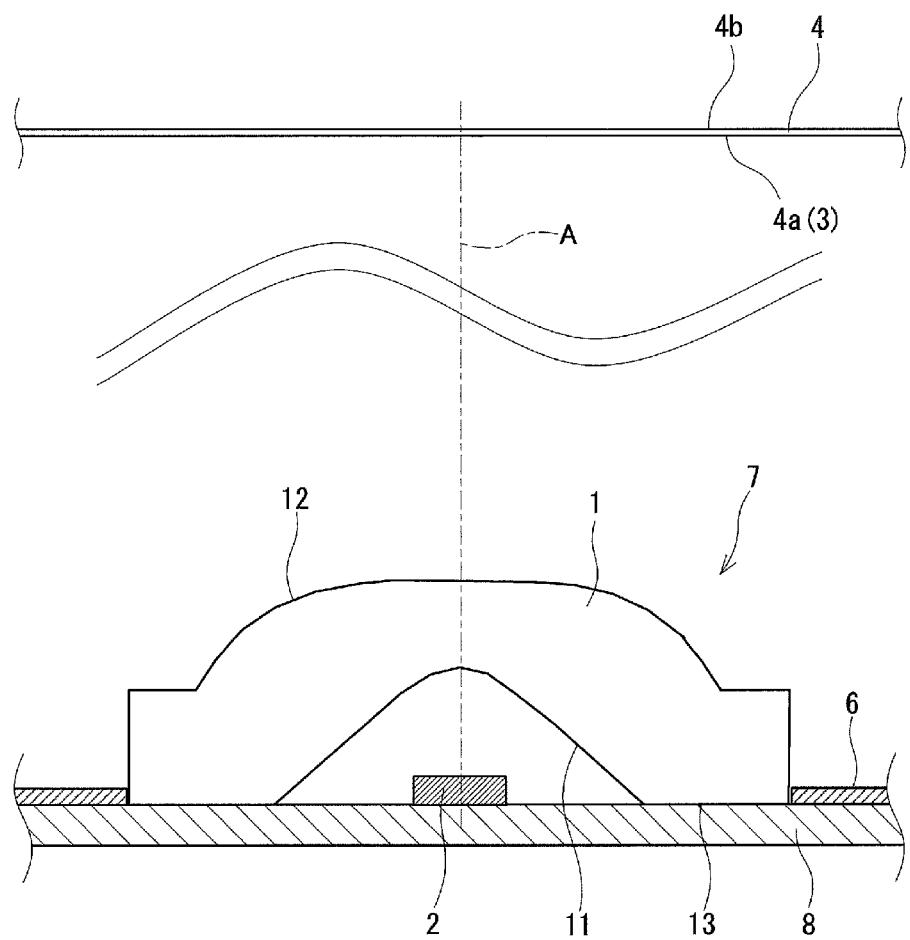
FIG. 21 is a partial cross sectional view of the surface light source according to the third embodiment of the present invention.

The surface light source 9 further includes a substrate 8 facing the diffusing plate 4 with the lighting devices 7 interposed therebetween. As shown in FIG. 21, the LEDs 2, each of which is included in the lighting device 7, are mounted on the substrate 8. In the present embodiment, the bottom surface 13 of the illuminating lens 1 is bonded to the substrate 8, and a reflecting plate 6 is disposed on the substrate 8 to cover the substrate 8 but not to cover the illuminating lenses 1. The bottom surface 13 of the illuminating lens 1 need not necessarily be bonded directly to the substrate 8. It may be joined to the substrate 8 by, for example, columnar supports interposed therebetween. In this case, since a space is formed between the substrate 8 and the bottom surface 13 of the illuminating lens 1, the reflecting plate 6 may be inserted into the space.

The lighting device 7 emits light to one surface 4a of the diffusing plate 4. That is, the one surface 4a of the diffusing plate 4 is the surface to be illuminated that has been described in the first and second embodiments. The diffusing plate 4 receives the emitted light on the one surface 4a and emits the light from the other surface 4b thereof in a diffused manner. Each of the lighting devices 7 emits, toward the one surface 4a of the diffusing plate 4, light that allows a uniform illuminance to be obtained in a large area of the one surface 4a. The diffusing plate 4 diffuses the illuminated light, and as a result, the illuminance unevenness on the surface light source can be reduced.

The light emitted from the lighting devices 7 is diffused by the diffusing plate 4 so as to return to the lighting device side and pass through the diffusing plate 4. The light that returns to the lighting device side and hits the reflecting plate 6 is reflected by the reflecting plate 6 and again enters the diffusing plate 4.

Figure 22A:
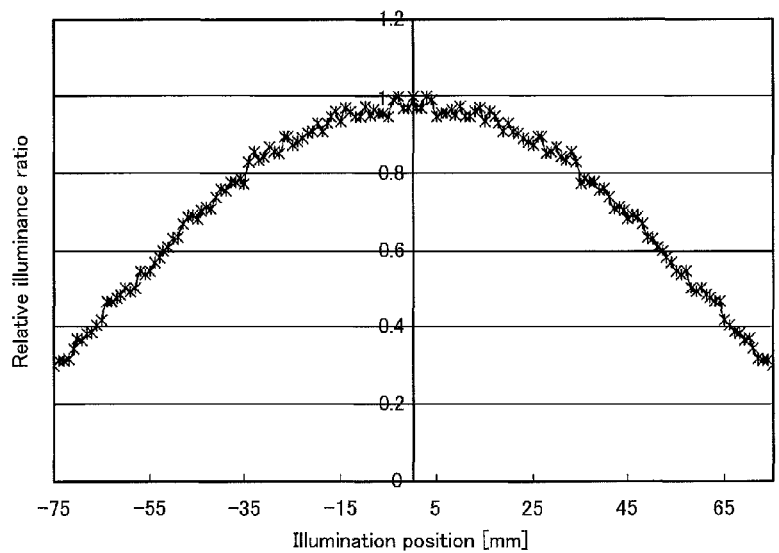
FIG. 22A shows an illuminance distribution obtained when the lighting devices of Example 1 are used in the surface light source according to the third embodiment of the present invention.
Figure 23A:
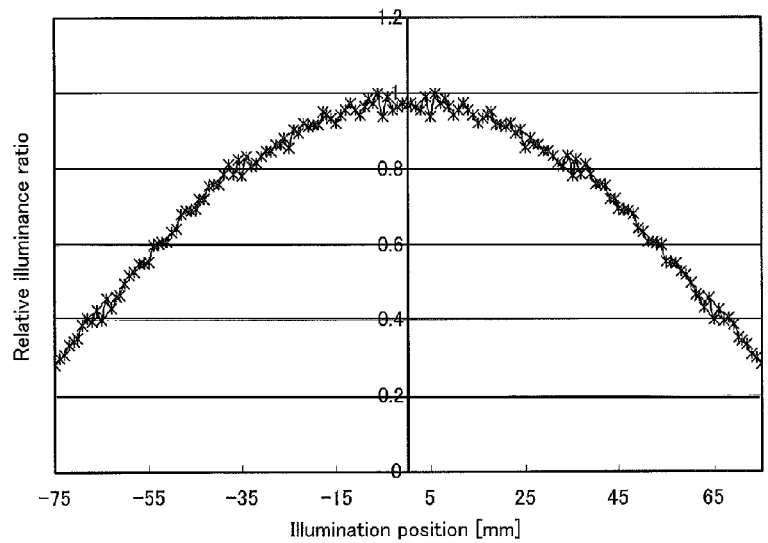
FIG. 23A shows an illuminance distribution obtained when the lighting devices of Example 2 are used in the surface light source according to the third embodiment of the present invention.

FIG. 22A shows an illuminance distribution on the light entrance surface (the one surface on the lighting device side) of the diffusing plate. This illuminance distribution is calculated on the assumption that four lighting devices of Example 1 are arranged in a straight line at a pitch of 30 mm and the diffusing plate is placed at a distance of 23 mm from the light emitting surfaces of the LEDs. Small fluctuations in the illuminance distribution are attributed to a small number of light rays to be evaluated in calculating the illuminances. FIG. 23A shows the illuminance distribution obtained in the same manner by using the lighting devices of Example 2.

Figure 22B:
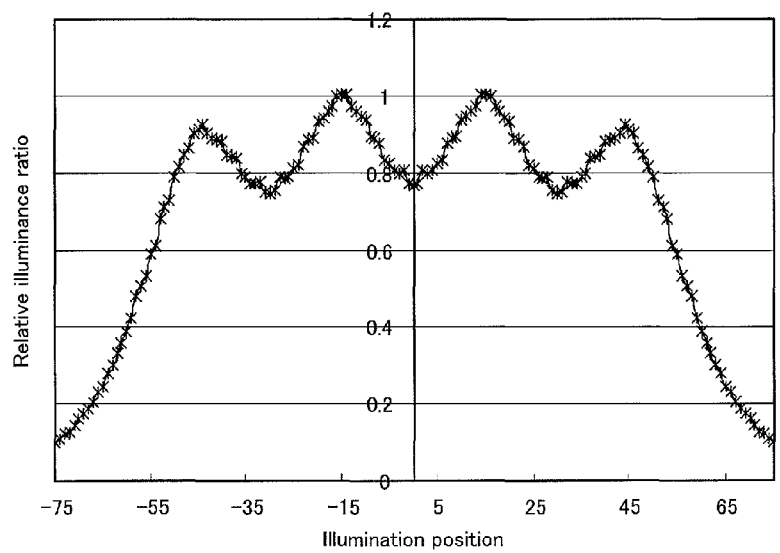
FIG. 22B shows an illuminance distribution obtained when lighting devices each composed of only an LED are used in the surface light source to confirm the effect of Example 1.
Figure 23B:
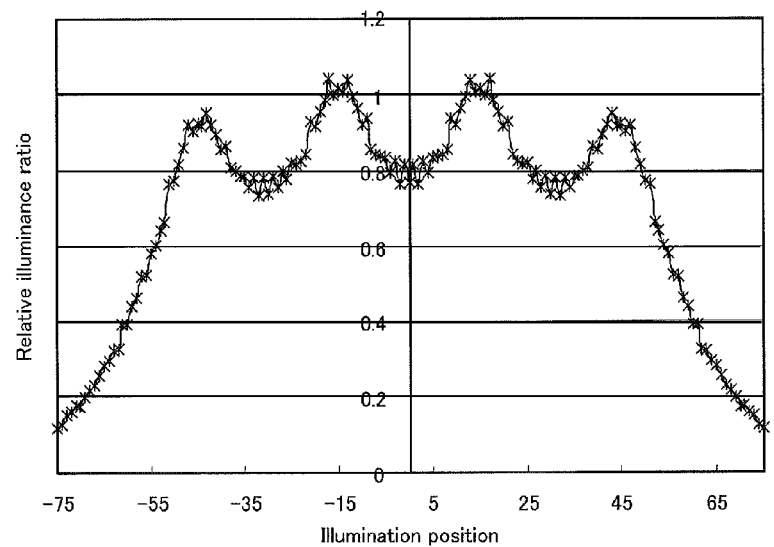
FIG. 23B shows an illuminance distribution obtained when lighting devices each composed of only an LED are used in the surface light source to confirm the effect of Example 2.

FIG. 22B and FIG. 23B each show an illuminance distribution on the light entrance surface of the diffusing plate. This illuminance distribution is calculated on the assumption that four LEDs only are arranged in a straight line at a pitch of 30 mm and the diffusing plate is placed at a distance of 23 mm from the LEDs. In FIG. 22B, LEDs (with a package size of 3.0 mm×2.0 mm) each with the sealing portion on its light emitting surface are used. In FIG. 23B, LEDs (with a package size of 5.8 mm×3.4 mm) each without the sealing portion on its light emitting surface are used.

Comparisons between FIG. 22A and FIG. 22B and between FIG. 23A and FIG. 23B show that the illuminating lenses 1 each having a shape encapsulating the light source are completely effective in illuminating the light entrance surface of the diffusing plate uniformly.

Figure 24:
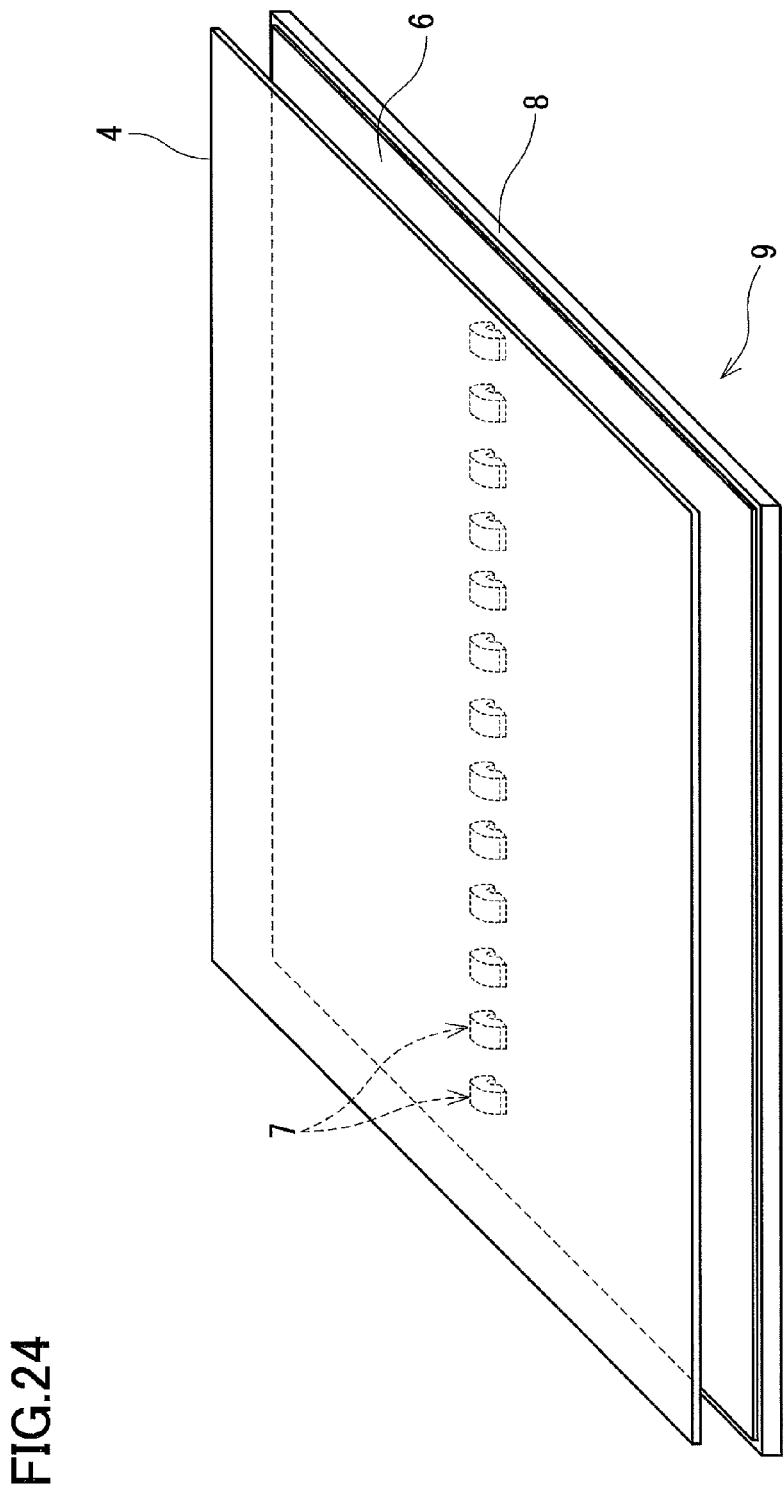
FIG. 24 is a diagram showing a structure of a modified surface light source.

FIG. 24 is a diagram showing a structure of a modified surface light source 9. In this surface light source 9, a plurality of lighting devices 7 each including the illuminating lens 10 for spreading light from the light source in only one direction (the first direction) (see FIG. 4) are arranged in a plane so that they form a line in the second direction perpendicular to the first direction at the central position in the first direction of the substrate 8. The lighting devices 7 need not necessarily be arranged in a line. They may be arranged in two or more straight lines that divide the substrate 8 into equal areas in the first direction.

Figure 25A:
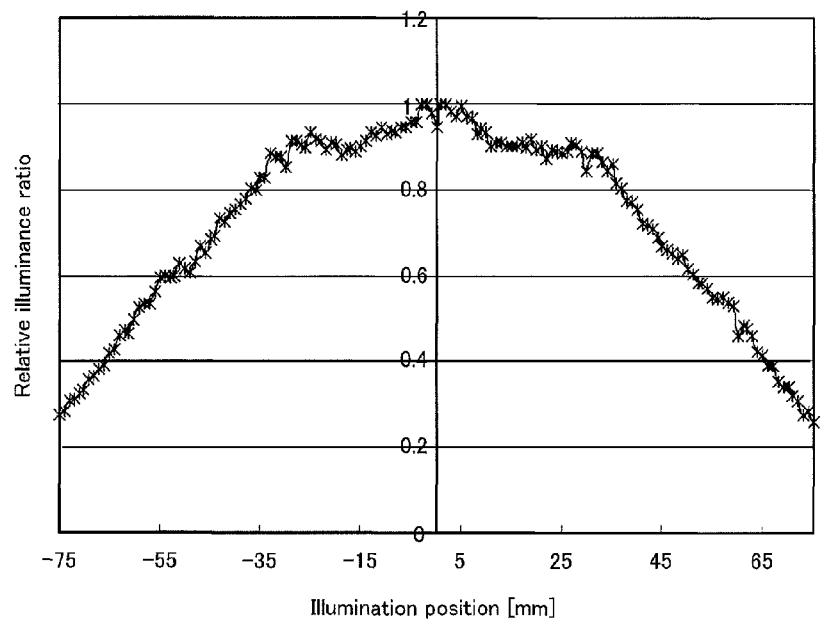
FIG. 25A shows an illuminance distribution obtained when the lighting devices of Example 3 are used in the surface light source according to the third embodiment of the present invention.
Figure 25B:
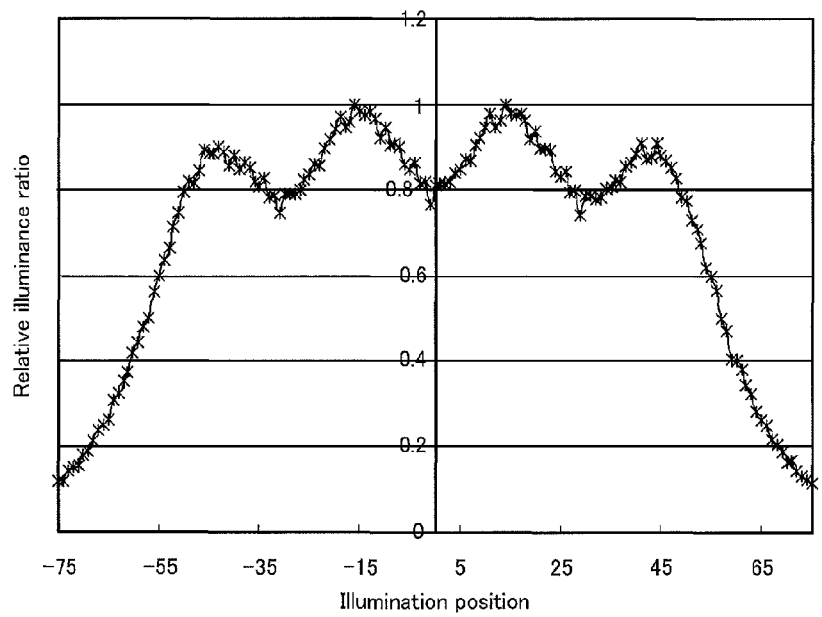
FIG. 25B shows an illuminance distribution obtained when lighting devices each composed of only an LED are used in the surface light source to confirm the effect of Example 3.

FIG. 25A shows an illuminance distribution on the light entrance surface (the one surface on the lighting device side) of the diffusing plate. This illuminance distribution is calculated on the assumption that four lighting devices of Example 3 are arranged in a straight line at a pitch of 30 mm and the diffusing plate is placed at a distance of 23 mm from the light emitting surfaces of the LEDs. FIG. 25B shows an illuminance distribution on the light entrance surface of the diffusing plate. This illuminance distribution is calculated on the assumption that four LEDs only are arranged in a straight line at a pitch of 30 mm and the diffusing plate is placed at a distance of 23 mm from the LEDs. In FIG. 25B, LEDs (with a package size of 3.0 mm×3.0 mm) each without the sealing portion on its light emitting surface are used. A comparison between FIG. 25A and FIG. 25B shows that the illuminating lenses 10 each having a two-forked shape straddling the light source between are effective in illuminating the light entrance surface of the diffusing plate uniformly.

Figure 26:
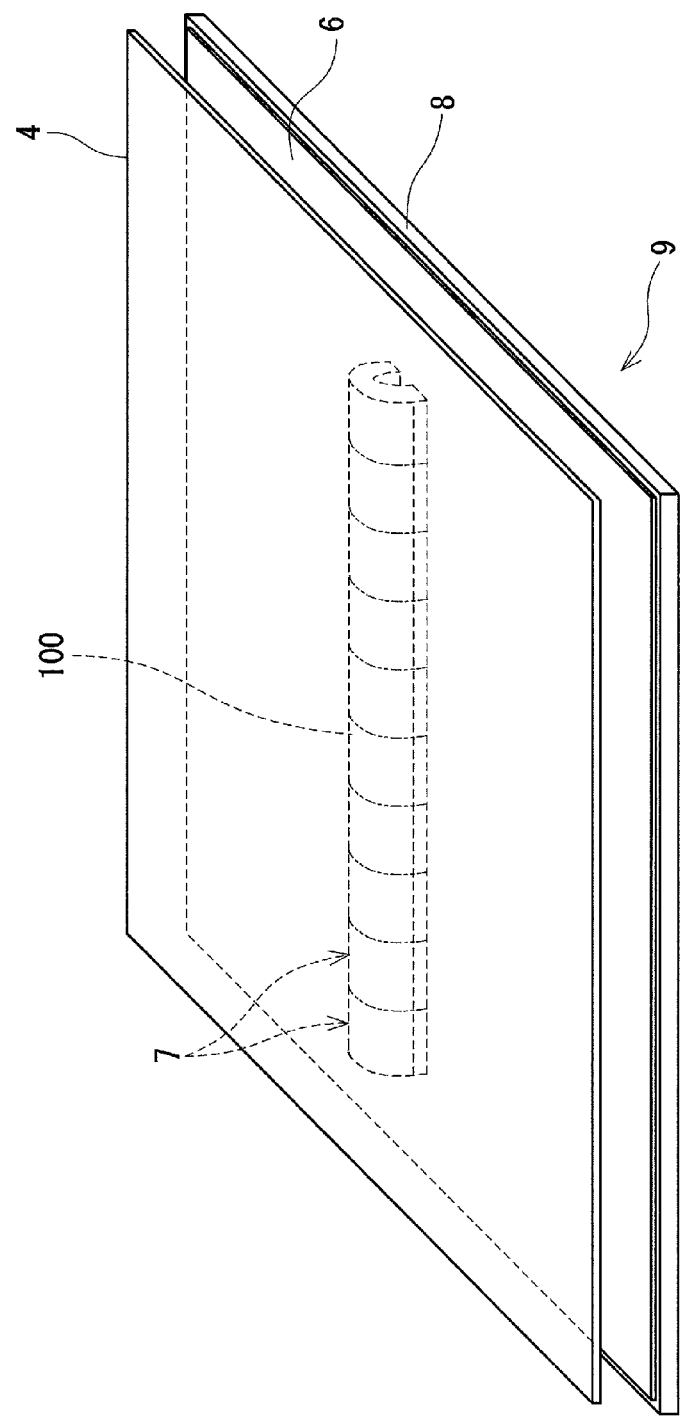
FIG. 26 is a diagram showing a structure of another modified surface light source.

The adjacent illuminating lenses 10 in the lighting devices 7 may be connected in series so that they form a single lens 100, as shown in FIG. 26.

Fourth Embodiment

FIG. 27 is a diagram showing a structure of a liquid crystal display according to a fourth embodiment of the present invention. This liquid crystal display apparatus includes a liquid crystal panel 5, and the surface light source 9 (see FIG. 20) of the third embodiment disposed behind the liquid crystal panel 5. This surface light source 9 includes the illuminating lenses 1 for spreading light from the light sources radially.

A plurality of lighting devices 7 each including the LED 2 and the illuminating lens 1 are arranged in a plane, and the diffusing plate 4 is illuminated by these lighting devices 7. The underside (one surface) of the diffusing plate 4 is irradiated with the light that allows a uniform illuminance to be obtained thereon, and then the light is diffused by the diffusing plate 4. Thus, the liquid crystal panel 5 is illuminated by the diffused light.

Preferably, an optical sheet such as a diffusing sheet or a prism sheet is disposed between the liquid crystal panel 5 and the surface light source 9. In this case, the light that has passed through the diffusing plate 4 further is diffused by the optical sheet, and the liquid crystal panel 5 is illuminated by the diffused light.

Needless to say, the liquid crystal display apparatus also can be constructed by disposing the surface light source 9 (see FIG. 24 and FIG. 26) including the illuminating lenses 10 for spreading light from the light sources in only one direction, behind the liquid crystal panel 5, although the apparatus is not illustrated here.

The invention claimed is:

1. An illuminating lens for spreading light from a light source in at least one direction perpendicular to a direction of an optical axis so that a surface to be illuminated is illuminated by the spread light, the lens comprising:
   a light entrance surface through which the light from the light source enters the lens;
   a light exit surface through which the light that has entered the lens exits the lens; and
   a bottom surface formed outside the light entrance surface and facing opposite to the light exit surface,
   wherein the light entrance surface has a first light entrance surface and a second light entrance surface, the first light entrance surface being a curved surface convex toward the light exit surface and perpendicularly intersecting the optical axis, and the second light entrance surface extending outwardly from an edge of the first light entrance surface and being connected obliquely to an inner edge of the bottom surface,
   in a cross section including the optical axis and taken along the one direction, $\theta 1$ has a negative value at the first light entrance surface and a positive value at the second light entrance surface, where $\theta 1$ is a refraction angle at which virtual light reaching the light entrance surface directly from a starting point on the optical axis corresponding to a position of the light source passes through the light entrance surface, and $\theta 1$ is defined as negative when $\theta 1$ is on the side of the optical axis with respect to a normal to the light entrance surface and as positive when $\theta 1$ is on the opposite side, and
   the following inequality holds:

$0.5 < sagY_{60}/sagY_0 < 0.8$ where in the cross section including the optical axis and taken along the one direction, when $\theta i$ is an angle between the optical axis and a straight line connecting an arbitrary point on the light exit surface and the starting point on the optical axis, sagY is a distance along the optical axis between the starting point on the optical axis and the arbitrary point on the light exit surface, $sagY_0$ is a sagY value at an angle $\theta i$ of 0°, and $sagY_{60}$ is a sagY value at an angle $\theta i$ of 60°.

2. The illuminating lens according to claim 1, wherein the second light entrance surface extends linearly outwardly from the edge of the first light entrance surface.

3. The illuminating lens according to claim 1, wherein the light entrance surface is a bowl-shaped concave surface, and the bottom surface is located around the light entrance surface.

4. The illuminating lens according to claim 1, wherein the light entrance surface is a cylindrical concave surface, and the bottom surface is located on both sides of the light entrance surface.

5. The illuminating lens according to claim 1, wherein in the cross section including the optical axis and taken along the one direction, an angle between the optical axis and a tangent at an arbitrary point on the second light entrance surface is 20° or more and 70° or less.

6. The illuminating lens according to claim 3, wherein the light entrance surface is rotationally symmetric with respect to the optical axis, and the second light entrance surface extends radially outwardly from a peripheral edge of the first light entrance surface and is connected obliquely to an inner peripheral edge of the bottom surface.

7. The illuminating lens according to claim 1, wherein the light exit surface is a continuous convex surface, and in the cross section including the optical axis and taken along the one direction, a curvature of a central portion of the light exit surface is substantially zero.

8. The illuminating lens according to claim 1, wherein the bottom surface is flat.

9. The illuminating lens according to claim 8, wherein the starting point on the optical axis is located in the same plane as the bottom surface or located closer to the first light exit surface than on the bottom surface.

10. A lighting device comprising:
   a light emitting diode for emitting light; and
   an illuminating lens for spreading light from the light emitting diode so that a surface to be illuminated is illuminated by the spread light,
   wherein the illuminating lens is the illuminating lens according to claim 1.

11. The lighting device according to claim 10, wherein the second light entrance surface extends in the optical axis direction beyond a light emitting surface of the light emitting diode.

12. The lighting device according to claim 10, wherein a dome-shaped sealing portion made of a sealing resin is formed on a light emitting surface of the light emitting diode.

13. A surface light source comprising:
   a plurality of lighting devices arranged in a plane; and
   a diffusing plate, disposed to cover the plurality of lighting devices, for receiving on one surface thereof light emitted from the plurality of lighting devices and emitting the light from the other surface thereof in a diffused manner,
   wherein each of the plurality of lighting devices is the lighting device according to claim 10.

14. The surface light source according to claim 13, further comprising:
   a substrate on which the light emitting diodes each of which is included in the lighting device are mounted, the substrate facing the diffusing plate with the plurality of lighting devices interposed therebetween; and
   a reflecting plate disposed on the substrate to cover the substrate but not to cover the illuminating lenses.

15. A liquid crystal display apparatus comprising:
   a liquid crystal panel; and
   the surface light source according to claim 13 disposed behind the liquid crystal panel.

* * * * *